US012425972B2

(12) United States Patent
Elshafie et al.

(10) Patent No.: US 12,425,972 B2
(45) Date of Patent: Sep. 23, 2025

(54) BANDWIDTH PART (BWP) DYNAMIC ADAPTATION IN ACCORDANCE WITH AN ENERGY LEVEL AT A USER EQUIPMENT (UE)

(71) Applicant: QUALCOMM Incorporated, San Diego, CA (US)

(72) Inventors: Ahmed Elshafie, San Diego, CA (US); Ahmed Attia Abotabl, San Diego, CA (US); Muhammad Sayed Khairy Abdelghaffar, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 17/735,999

(22) Filed: May 3, 2022

(65) Prior Publication Data

US 2023/0362820 A1    Nov. 9, 2023

(51) Int. Cl.
*H04W 52/00*  (2009.01)
*H04W 52/02*  (2009.01)
*H04W 72/0453*  (2023.01)

(52) U.S. Cl.
CPC ... *H04W 52/0251* (2013.01); *H04W 72/0453* (2013.01)

(58) Field of Classification Search
CPC ............ H04W 52/0251; H04W 72/0453
See application file for complete search history.

(56) References Cited

U.S. PATENT DOCUMENTS

| 2019/0149380 A1* | 5/2019 | Babaei | H04W 72/23 370/330 |
| 2022/0070103 A1* | 3/2022 | Kanamarlapudi | H04W 28/0278 |
| 2023/0121938 A1* | 4/2023 | Zhou | H04W 72/23 375/347 |
| 2023/0308948 A1* | 9/2023 | Jia | H04W 28/0967 |

OTHER PUBLICATIONS

International Search Report and Written Opinion—PCT/US2023/065702—ISA/EPO—Aug. 24, 2023.
(Continued)

*Primary Examiner* — Erika A Washington
(74) *Attorney, Agent, or Firm* — Holland & Hart LLP

(57) ABSTRACT

This disclosure provides systems, methods, and apparatus, including computer programs encoded on computer storage media, for bandwidth part (BWP) dynamic adaptation in accordance with an energy level at a user equipment (UE). In some systems, the UE may implement techniques for power savings by operating according to a narrower BWP in accordance with an energy level at the UE. In some implementations, the UE may reduce the bandwidth size of the active BWP if the UE energy level satisfies a threshold. The UE may transmit signaling to the network indicating that the bandwidth size of the active BWP is reduced. Additionally, or alternatively, the UE may fall back to a default BWP if the UE energy level satisfies a threshold. For example, the UE may fall back to the default BWP prior to expiration of a timer configured to trigger the UE to fall back to the default BWP.

26 Claims, 12 Drawing Sheets

(56) References Cited

OTHER PUBLICATIONS

Abinader F., et al., "Impact of Bandwidth Part (BWP) Switching on 5G NR System Performance" 2019 IEEE 2nd 5G World Forum (5GWF), IEEE, Sep. 30, 2019, pp. 161-166, XP033665220, Sections I-V.
Ericsson: "On Bandwidth Parties", 3GPP TSG RAN WG1 NR Ad-Hoc#2, R1-1711565, vol. RAN WG1, No. Qingdao, P.R. China, Jun. 27, 2017-Jun. 30, 2017, Jun. 26, 2017, 3 Pages, XP051300748, Sections 1-3.
Partial International Search Report—PCT/US2023/065702—ISA/EPO—Jul. 3, 2023.
Potevio: "BWP Switch on C-DRX", 3GPP TSG RAN WG2 Meeting #100, R2-1712969, 3rd Generation Partnership Project (3GPP), Mobile Competence Centre, 650, Route Des Lucioles, F-06921, Sophia-Antipolis Cedex, France, vol. RAN WG2, No. Reno, USA, Nov. 27, 2017-Dec. 1, 2017, Nov. 17, 2017, 3 Pages, XP051371820, Sections 1-3.

\* cited by examiner

BANDWIDTH PART (BWP) DYNAMIC ADAPTATION IN ACCORDANCE WITH AN ENERGY LEVEL AT A USER EQUIPMENT (UE)

TECHNICAL FIELD

This disclosure relates to wireless communications, including bandwidth part (BWP) dynamic adaptation in accordance with an energy level at a user equipment (UE).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources, such as time, frequency, and power resources. Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, such as one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method includes selecting a bandwidth size of an active bandwidth part (BWP) in accordance with an energy level of the UE satisfying a threshold energy level. The method further includes switching the active BWP from a first bandwidth size to the selected bandwidth size and transmitting an indication that the bandwidth size of the active BWP is selected.

Another innovative aspect of the subject matter described in this disclosure can be implemented in an apparatus for wireless communications. The apparatus may include an interface and a processing system. The processing system may be configured to select a bandwidth size of an active BWP in accordance with an energy level of the UE satisfying a threshold energy level and switch the active BWP from a first bandwidth size to the selected bandwidth size. The interface may be configured to output an indication that the bandwidth size of the active BWP is selected.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to select a bandwidth size of an active BWP in accordance with an energy level of the UE satisfying a threshold energy level. The instructions may be further executable by the processor to cause the apparatus to switch the active BWP from a first bandwidth size to the selected bandwidth size and transmit an indication that the bandwidth size of the active BWP is selected Another innovative aspect of the subject matter described in this disclosure can be implemented in an apparatus for wireless communications at a UE. The apparatus may include means for selecting a bandwidth size of an active BWP in accordance with an energy level of the UE satisfying a threshold energy level. The apparatus may further include means for switching the active BWP from a first bandwidth size to the selected bandwidth size and means for transmitting an indication that the bandwidth size of the active BWP is selected.

Another innovative aspect of the subject matter described in this disclosure can be implemented in a non-transitory computer-readable medium storing code for wireless communications at a UE. The code may include instructions executable by a processor to select a bandwidth size of an active BWP in accordance with an energy level of the UE satisfying a threshold energy level. The code may further include instructions executable by the processor to switch the active BWP from a first bandwidth size to the selected bandwidth size and transmit an indication that the bandwidth size of the active BWP is selected.

Some implementations of the method, apparatuses, and non-transitory computer-readable medium described herein may further include operations, features, means, or instructions for communicating using the selected bandwidth size of the active BWP in accordance with the indication and the switching.

One innovative aspect of the subject matter described in this disclosure can be implemented in a method for wireless communications at a UE. The method includes switching an active BWP from a first BWP to a default BWP prior to an expiration of a timer for falling back to the default BWP, the switching the active BWP being in accordance with an energy level of the UE satisfying a threshold energy level. The method further includes communicating using the default BWP as the active BWP.

Another innovative aspect of the subject matter described in this disclosure can be implemented in an apparatus for wireless communication. The apparatus may include an interface and a processing system. The processing system may be configured to switch an active BWP from a first BWP to a default BWP prior to an expiration of a timer for falling back to the default BWP, the switching the active BWP being in accordance with an energy level of the UE satisfying a threshold energy level. The interface may be configured to output or obtain signaling using the default BWP as the active BWP.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to switch an active BWP from a first BWP to a default BWP prior to an expiration of a timer for falling back to the default BWP, the switching the active BWP being in accordance with an energy level of the UE satisfying a threshold energy level. The instructions may be further executable by the processor to cause the apparatus to communicate using the default BWP as the active BWP.

Another innovative aspect of the subject matter described in this disclosure can be implemented in an apparatus for wireless communications at a UE. The apparatus may include means for switching an active BWP from a first BWP to a default BWP prior to an expiration of a timer for falling back to the default BWP, the switching the active BWP being in accordance with an energy level of the UE satisfying a threshold energy level. The apparatus may further include means for communicating using the default BWP as the active BWP.

Another innovative aspect of the subject matter described in this disclosure can be implemented in a non-transitory computer-readable medium storing code for wireless communications at a UE. The code may include instructions executable by a processor to switch an active BWP from a first BWP to a default BWP prior to an expiration of a timer for falling back to the default BWP, the switching the active BWP being in accordance with an energy level of the UE satisfying a threshold energy level. The code may include instructions executable by a processor to communicate using the default BWP as the active BWP.

Some implementations of the method, apparatuses, and non-transitory computer-readable medium described herein may further include operations, features, means, or instructions for initializing the timer for falling back to the default BWP in response to inactivity on the active BWP by the UE and deactivating the timer for falling back to the default BWP in accordance with the switching and prior to the expiration of the timer for falling back to the default BWP.

In some implementations of the method, apparatuses, and non-transitory computer-readable medium described herein, the timer for falling back to the default BWP corresponds to the energy level of the UE failing to satisfy the threshold energy level and the method, apparatuses, and non-transitory computer-readable medium may include further operations, features, means, or instructions for initializing a second timer corresponding to the energy level of the UE satisfying the threshold energy level, where a duration of the second timer may be shorter than a duration of the timer configured for falling back to the default BWP, and where the active BWP may be switched from the first BWP to the default BWP in accordance with an expiration of the second timer.

One innovative aspect of the subject matter described in this disclosure can be implemented in a method for wireless communications. The method includes receiving an indication that a UE is to select a bandwidth size of an active BWP in accordance with an energy level of the UE satisfying a threshold energy level. The method further includes selecting the bandwidth size of the active BWP for communications with the UE in accordance with the received indication.

Another innovative aspect of the subject matter described in this disclosure can be implemented in an apparatus for wireless communications. The apparatus may include an interface and a processing system. The interface may be configured to obtain an indication that a UE is to select a bandwidth size of an active BWP in accordance with an energy level of the UE satisfying a threshold energy level. The processing system may be configured to select the bandwidth size of the active BWP for communications with the UE in accordance with the obtained indication.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to receive an indication that a UE is to select a bandwidth size of an active BWP in accordance with an energy level of the UE satisfying a threshold energy level. The instructions may be further executable by the processor to cause the apparatus to select the bandwidth size of the active BWP for communications with the UE in accordance with the received indication.

Another innovative aspect of the subject matter described in this disclosure can be implemented in an apparatus for wireless communications. The apparatus may include means for receiving an indication that a UE is to select a bandwidth size of an active BWP in accordance with an energy level of the UE satisfying a threshold energy level. The apparatus may further include means for selecting the bandwidth size of the active BWP for communications with the UE in accordance with the received indication.

Another innovative aspect of the subject matter described in this disclosure can be implemented in a non-transitory computer-readable medium storing code for wireless communications. The code may include instructions executable by a processor to receive an indication that a UE is to select a bandwidth size of an active BWP in accordance with an energy level of the UE satisfying a threshold energy level. The code may further include instructions executable by the processor to select the bandwidth size of the active BWP for communications with the UE in accordance with the received indication.

Some implementations of the method, apparatuses, and non-transitory computer-readable medium described herein may further include operations, features, means, or instructions for communicating using the selected bandwidth size of the active BWP.

One innovative aspect of the subject matter described in this disclosure can be implemented in a method for wireless communications. The method includes receiving an indication that a UE is to switch an active BWP from a first BWP to a default BWP prior to an expiration of a timer configured for the UE to fall back to the default BWP, the switching the active BWP being in accordance with an energy level of the UE satisfying a threshold energy level. The method further includes switching the active BWP for communications with the UE from the first BWP to the default BWP in accordance with the received indication and communicating using the default BWP as the active BWP.

Another innovative aspect of the subject matter described in this disclosure can be implemented in an apparatus for wireless communications. The apparatus may include an interface and a processing system. The interface may be configured to obtain an indication that a UE is to switch an active BWP from a first BWP to a default BWP prior to an expiration of a timer configured for the UE to fall back to the default BWP, the switching the active BWP being in accordance with an energy level of the UE satisfying a threshold energy level. The processing system may be configured to switch the active BWP for communications with the UE from the first BWP to the default BWP in accordance with the obtained indication. The interface may be further configured to output or obtain signaling using the default BWP as the active BWP.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to receive an indication that a UE is to switch an active BWP from a first BWP to a default BWP prior to an expiration of a timer configured for the UE to fall back to the default BWP, the switching the active BWP being in accordance with an energy level of the UE satisfying a threshold energy level. The instructions may be further executable by the processor to cause the apparatus to switch the active BWP for communications with the UE from the first BWP to the default BWP in accordance with the received indication and communicate using the default BWP as the active BWP.

Another innovative aspect of the subject matter described in this disclosure can be implemented in an apparatus for wireless communications. The apparatus may include means for receiving an indication that a UE is to switch an active BWP from a first BWP to a default BWP prior to an expiration of a timer configured for the UE to fall back to the default BWP, the switching the active BWP being in accordance with an energy level of the UE satisfying a threshold energy level. The apparatus may further include means for switching the active BWP for communications with the UE from the first BWP to the default BWP in accordance with the received indication and means for communicating using the default BWP as the active BWP.

Another innovative aspect of the subject matter described in this disclosure can be implemented in a non-transitory computer-readable medium storing code for wireless communications. The code may include instructions executable by a processor to receive an indication that a UE is to switch an active BWP from a first BWP to a default BWP prior to an expiration of a timer configured for the UE to fall back to the default BWP, the switching the active BWP being in accordance with an energy level of the UE satisfying a threshold energy level. The code may further include instructions executable by the processor to switch the active BWP for communications with the UE from the first BWP to the default BWP in accordance with the received indication and communicate using the default BWP as the active BWP.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
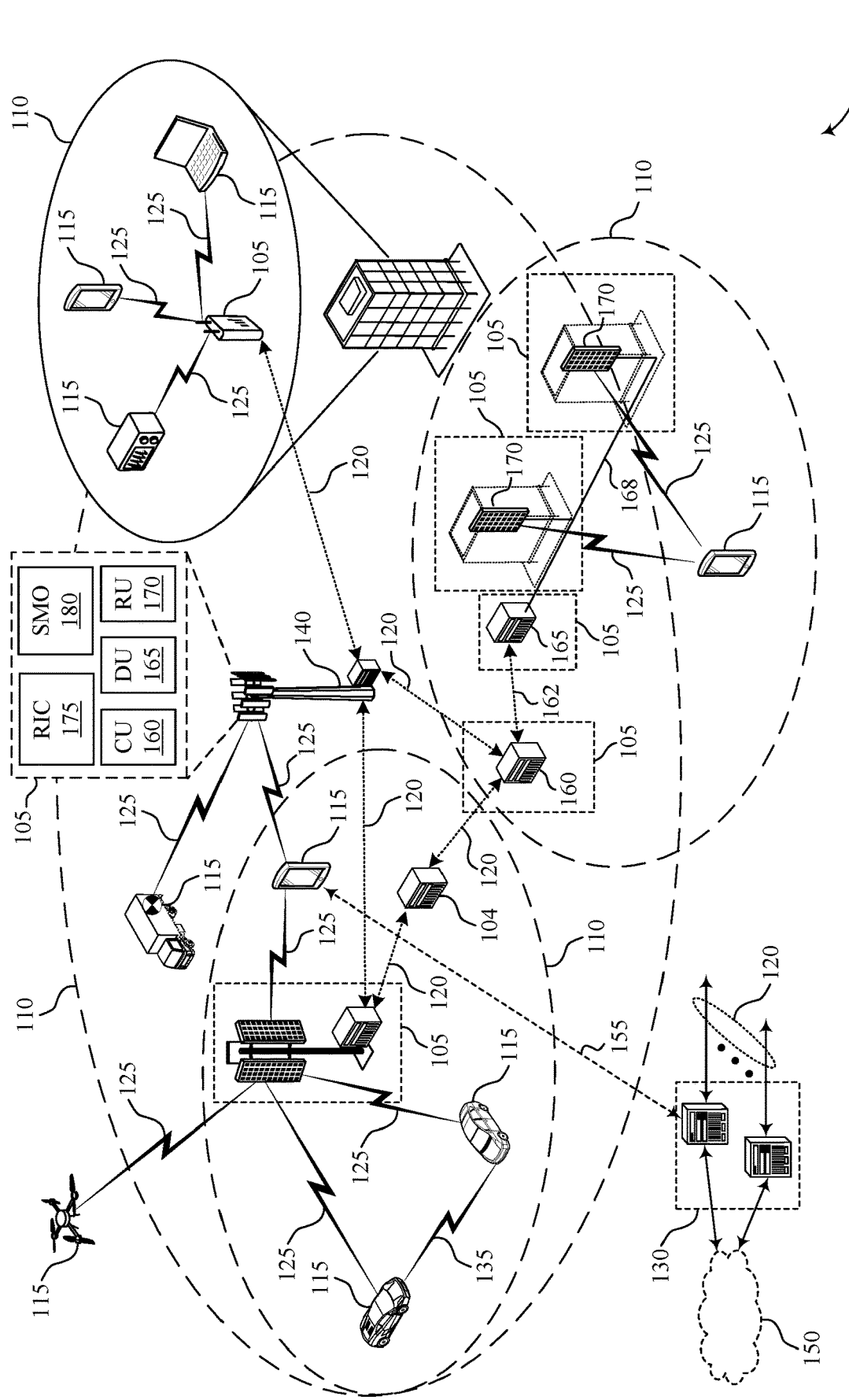
FIG. 1 shows an example wireless communications system that supports bandwidth part (BWP) dynamic adaptation in accordance with an energy level at a user equipment (UE).

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G), or fifth generation (5G), or further implementations thereof, technology.

Some wireless communications systems support user equipment (UEs) that may operate using power saving techniques. For example, a UE (such as a passive IOT device, a low power device, a low complexity device, or a reduced capability (RedCap) device) may reduce a bandwidth size for operations to effectively save power at the UE. The UE may operate according to one or more active bandwidth parts (BWPs). The UE may dynamically adapt the bandwidth size of an active BWP in accordance with an energy level of the UE. For example, if the current energy level of the UE satisfies a threshold energy level (such as the current energy level being less than the threshold energy level), the UE may perform one or more power saving operations. In some implementations, the UE may switch the bandwidth size of the active BWP in accordance with the energy level of the UE satisfying the threshold energy level. Additionally, or alternatively, the UE may switch the active BWP from a first BWP to a default BWP in accordance with the energy level of the UE satisfying the threshold energy level, where the default BWP may span fewer frequency resources than the first BWP. In some implementations, the UE may fall back to using the default BWP as the active BWP prior to expiration of a timer that is configured to trigger fallback to the default BWP, for example, according to the energy level of the UE satisfying a threshold.

The UE may communicate with a network entity regarding a dynamic adaptation to the active BWP. In some implementations, the UE may transmit an indication of switching the bandwidth size of the active BWP. Additionally, or alternatively, the UE may transmit an indication of switching the active BWP from a first BWP to a default BWP. In some implementations, the UE may transmit a request to adapt the active BWP, and the network (such as via a network entity) may respond with a confirmation for the UE to adapt the active BWP. Additionally, or alternatively, the network may configure the UE to support adapting the active BWP in accordance with an energy level of the UE. For example, a network entity may transmit control signaling to the UE configuring the UE to support switching a bandwidth size of the active BWP, falling back to a default BWP, or both in accordance with the energy level at the UE satisfying a threshold energy level.

Particular implementations of the subject matter described in this disclosure can be implemented to realize one or more of the following potential advantages. A UE may achieve power savings by adapting the active BWP in accordance with an energy level of the UE. For example, the UE may reduce the bandwidth size of the active BWP (such as by switching the bandwidth size or by falling back to a default BWP). Reducing the bandwidth size of the active BWP may correspondingly reduce the quantity of frequency resources for the UE to monitor, reduce the quantity of reference signals for the UE to receive, measure, and process, or both, effectively reducing the processing overhead at the UE. Additionally, or alternatively, the UE may indicate the adaptation of the active BWP to the network to support coordination between the UE and the network. For example, the network may receive the indication that the UE is adapting the active BWP, and the network may adjust communications with the UE to use the reduced bandwidth size of the active BWP, improving signaling reliability between the network and UE and avoiding any potential gaps in coverage due to the UE adapting the active BWP. Additionally, or alternatively, low power devices (such as passive IOT devices or other UEs supporting energy harvesting) may use techniques described herein to allow energy harvesting to provide sufficient power for the UE to operate. For example, a low power device performing energy harvesting may reduce the bandwidth size of the active BWP or may fall back to the default BWP to lower the processing overhead at the low power device such that the energy harvesting rate of the device exceeds the energy expenditure rate of the device, effectively allowing the device to charge (increase the available battery power at the device).

FIG. 1 shows an example wireless communications system 100 that supports BWP dynamic adaptation in accordance with an energy level at a UE. The wireless communications system 100 may include one or more network entities 105, one or more UEs 115, and a core network 130. In some implementations, the wireless communications system 100 may be an LTE network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as an RF access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120, for example, in accordance with an S1, N2, N3, or other interface protocol. In some implementations, network entities 105 may communicate with one another over a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link or an optical fiber link), one or more wireless links (such as a radio link or a wireless optical link), among other examples or various combinations thereof. A UE 115 may communicate with the core network 130 through a communication link 155.

One or more of the network entities 105 described herein may include or may be referred to as a base station (BS) 140

(such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105—such as a BS 140—may be implemented in an aggregated (such as a monolithic or standalone) BS architecture, which may be configured to utilize a protocol stack that is physically or logically integrated within a single network entity 105 (such as a single RAN node, which may be an example of a BS 140).

In some implementations, a network entity 105 may be implemented in a disaggregated architecture (such as a disaggregated BS architecture or a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC) or a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission/reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), or a virtual RU (VRU)).

The split of functionality between a CU 160, a DU 165, and an RU 170 is flexible and may support different functionalities depending upon which functions (such as network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer functionality (such as layer 3 (L3) or layer 2 (L2) functionality) and signaling (such as Radio Resource Control (RRC), service data adaption protocol (SDAP), or Packet Data Convergence Protocol (PDCP) signaling). The CU 160 may be connected to one or more DUs 165 or RUs 170, and the one or more DUs 165 or RUs 170 may host lower protocol layers, such as layer 1 (L1) or physical (PHY) layer functionality and signaling or L2, radio link control (RLC) layer, or medium access control (MAC) layer functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165 or between a DU 165 and an RU 170 may be within a protocol layer. That is, some functions for a protocol layer may be performed by one of a CU 160, a DU 165, or an RU 170, while other functions of the protocol layer are performed by a different one of the CU 160, the DU 165, or the RU 170. A CU 160 may be functionally split further into CU control plane (CU-CP) and CU user plane (CU-UP) functions. A CU 160 may be connected to one or more DUs 165 via a midhaul communication link 162 (such as an F1, F1-c, or F1-u link), and a DU 165 may be connected to one or more RUs 170 via a fronthaul communication link 168 (such as an open fronthaul (FH) interface). In some implementations, a midhaul communication link 162 or a fronthaul communication link 168 may be implemented in accordance with an interface (such as a channel) between layers of a protocol stack supported by respective network entities 105 that are in communication over such communication links.

In some wireless communications systems, such as the wireless communications system 100, infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 may be in communication with one or more additional network entities 105 (such as IAB nodes 104) via supported access and backhaul links, including backhaul communication links 120. IAB nodes 104 may include an IAB mobile termination (IAB-MT) controlled or scheduled by DUs 165 of a coupled IAB donor. An IAB-MT may include an independent set of antennas for relay of communications with UEs 115 or may share the same antennas (such as antennas of an RU 170) of an IAB node 104 used for access via the DU 165 of the IAB node 104, which may be referred to as virtual IAB-MT (vIAB-MT). In some implementations, the IAB nodes 104 may include DUs 165 that support communication links with additional entities (such as IAB nodes 104 or UEs 115) within the relay chain or configuration of the access network. In some such implementations, one or more components of the disaggregated RAN architecture (such as one or more IAB nodes 104 or components of IAB nodes 104) may be configured to operate according to the techniques described herein.

For example, an access network (AN) or RAN may include communications between access nodes (such as IAB donors), IAB nodes 104, and one or more UEs 115. An IAB donor may facilitate connection between the core network 130 and the AN (such as via a wired or wireless connection to the core network 130). That is, an IAB donor may refer to a RAN node with a wired or wireless connection to the core network 130. The IAB donor may include a CU 160 and at least one DU 165—and, in some implementations, an RU 170—where the CU 160 may communicate with the core network 130 over an interface (such as a backhaul link). IAB donor and IAB nodes 104 may communicate over an F1 interface according to a protocol that defines signaling messages, such as an F1 AP protocol. Additionally, or alternatively, the CU 160 may communicate with the core network over an interface, which may be an example of a portion of a backhaul link, and may communicate with other CUs 160 (such as a CU 160 associated with an alternative IAB donor) over an Xn-C interface, which may be an example of a portion of a backhaul link.

An IAB node 104 may refer to a RAN node that provides IAB functionality (such as access for UEs 115 or wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes. For example, an IAB donor may relay transmissions for UEs through one or more other IAB nodes 104. Additionally, or alternatively, an IAB node 104 also may be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (such as DUs 165) may provide a Uu interface for a parent IAB node 104 to signal to a child IAB node 104 or UE 115.

For example, an IAB node 104 may be referred to as a parent node that supports communications for a child IAB node and also may be referred to as a child IAB node associated with an IAB donor. The IAB donor may include a CU 160 with a wired or wireless connection (such as a backhaul communication link 120) to the core network 130 and may act as parent node to IAB nodes 104. For example, the DU 165 of an IAB donor may relay transmissions to UEs 115 through IAB nodes 104 and may directly signal transmissions to a UE 115. The CU 160 of an IAB donor may signal communication link establishment via an F1 interface to IAB nodes 104, and the IAB nodes 104 may schedule transmissions (such as transmissions to the UEs 115 relayed from the IAB donor) through the DUs 165. That is, data may be relayed to and from IAB nodes 104 via signaling over an NR Uu interface to an MT of the IAB node 104. Communications with an IAB node 104 may be scheduled by a DU 165 of an IAB donor.

If the techniques described herein are applied in the context of a disaggregated RAN architecture, one or more components of the disaggregated RAN architecture may be configured to support BWP dynamic adaptation in accordance with an energy level at a UE 115 as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180, or any combination thereof).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an IOT device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) over one or more carriers. The term "carrier" may refer to a set of RF spectrum resources having a defined physical layer structure for supporting the communication links 125. For example, a carrier used for a communication link 125 may include a portion of an RF spectrum band (such as a BWP) that is operated according to one or more physical layer channels for a given radio access technology (such as LTE, LTE-A, LTE-A Pro, NR, or another RAT). Each physical layer channel may carry acquisition signaling (such as synchronization signals, system information, or both), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as an entity or sub-entity) of a network entity 105. For example, the terms "transmitting," "receiving," or "communicating," when referring to a network entity 105, may refer to any portion of a network entity 105 (such as a BS 140, a CU 160, a DU 165, an RU 170, or any other portion) of a RAN communicating with another device, directly or via one or more other network entities 105.

In some implementations, such as in a carrier aggregation configuration, a carrier also may have acquisition signaling or control signaling that coordinates operations for other carriers. A carrier may be associated with a frequency channel (such as an evolved universal mobile telecommunication system terrestrial radio access (E-UTRA) absolute RF channel number (EARFCN)) and may be positioned according to a channel raster for discovery by the UEs 115. A carrier may be operated in a standalone mode, where initial acquisition and connection may be conducted by the UEs 115 via the carrier, or the carrier may be operated in a non-standalone mode, where a connection may be anchored using a different carrier of the same or a different RAT.

The communication links 125 shown in the wireless communications system 100 may include downlink transmissions (such as forward link transmissions) from a network entity 105 to a UE 115, uplink transmissions (such as return link transmissions) from a UE 115 to a network entity 105, or both, among other configurations of transmissions. Carriers may carry downlink or uplink communications (such as in an FDD mode) or may be configured to carry downlink and uplink communications (such as in a TDD mode).

A carrier may be associated with a particular bandwidth of the RF spectrum and, in some implementations, the carrier bandwidth may be referred to as a "system bandwidth" of the carrier or the wireless communications system 100. For example, the carrier bandwidth may be one of a set of bandwidths for carriers of a specific RAT (such as 1.4, 3, 5, 10, 15, 20, 40, or 80 megahertz (MHz)). Devices of the wireless communications system 100, including the network entities 105, the UEs 115, or both, may have hardware configurations that support communications over a particular carrier bandwidth or may be configurable to support communications over one of a set of carrier bandwidths. In some implementations, the wireless communications system 100 may include network entities 105 or UEs 115 that support concurrent communications via carriers associated with multiple carrier bandwidths. In some implementations, each served UE 115 may be configured for operating over portions of a carrier bandwidth, such as a sub-band or a BWP, or all of a carrier bandwidth.

Signal waveforms transmitted over a carrier may be made up of multiple subcarriers. The signal waveforms may be transmitted using multi-carrier modulation (MCM) techniques such as orthogonal frequency division multiplexing (OFDM) or discrete Fourier transform spread OFDM (DFT-S-OFDM). In a system employing MCM techniques, a resource element may refer to resources of one symbol period (such as a duration of one modulation symbol) and one subcarrier, where the symbol period and subcarrier spacing may be inversely related. The quantity of bits carried by each resource element may depend on the modulation scheme (such as the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (such as a spatial layer or beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN), for example, ranging from 0 to 1023.

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods depending on the length of the cyclic prefix prepended to each symbol period. In some wireless communications systems 100, a slot may further be divided into multiple mini-slots including one or more symbols. Excluding the cyclic prefix, each symbol period may include one or more sampling periods, such as $N_f$ sampling periods. The duration of a symbol period may depend on the subcarrier spacing or frequency band of operation.

A subframe, a slot, a mini-slot, or a symbol may be the smallest scheduling unit in the time domain for the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region, such as a control resource set (CORESET), for a physical control channel may be defined by a set of symbol periods and may extend across the system bandwidth or a subset of the system bandwidth of the carrier. One or more control regions may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140 or an RU 170) may be movable and therefore provide communication coverage for a moving coverage area 110. In some implementations, different coverage areas 110 associated with different technologies may overlap, but the different coverage areas 110 may be supported by the same network entity 105. In some other implementations, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

Some UEs 115, such as MTC or IOT devices, may be low cost or low complexity devices and may provide for automated communication between machines (such as via Machine-to-Machine (M2M) communication). M2M communication or MTC may refer to data communication technologies that allow devices to communicate with one another or a network entity 105 (such as a BS 140) without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications. Half-duplex mode may support one-way communication via transmission or reception but may not support transmission and reception concurrently. In some implementations, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as a set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be able to communicate directly with other UEs 115 over a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140 or an RU 170), which may support aspects of such D2D communications being configured by or scheduled by the network entity 105. In some implementations, one or more UEs 115 in such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other implementations, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME) or an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some implementations, operations in unlicensed bands may be associated with a carrier aggregation configuration in conjunction with component carriers operating in a licensed band. Operations in the unlicensed spectrum may include downlink transmissions, uplink transmissions, P2P transmissions, or D2D transmissions, among other examples.

A network entity 105 (such as a BS 140 or an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105 or a UE 115) to shape or steer an antenna beam (such as a transmit beam or a receive beam) along a spatial path between the transmitting device and the receiving device. Beamforming may be achieved by combining the signals communicated via antenna elements of an antenna array such that some signals propagating at specific orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer also may use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (such as a communication link 125 or a D2D communication link 135). HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

The wireless communications system 100 may support devices (such as UEs 115) that operate using low power, low complexity, or both. For example, a UE 115 may operate below a power threshold, a complexity threshold, or both. Such a UE 115 may be referred to as a low power device, a very low power device, a no power device, a zero-power device, a near-zero-power device, a low capability device, a RedCap device, an enhanced RedCap (eRedCap) device, a low complexity device, a passive IOT device, or any other name referring to UEs 115 that operate below a power threshold. In some implementations, such devices may utilize energy harvesting techniques to charge batteries or other power supplies at the devices to support such low power operations. For example, a UE 115 may harvest energy from RF energy (such as over-the-air RF signals), solar power, vibrations at the UE 115, or any combination thereof. However, in some implementations, the energy harvesting may fail to supply sufficient energy to support the operations at a UE 115.

To conserve power at a UE 115, the UE 115 may perform one or more power saving operations. In some implementations, a UE 115 may fall back to using a default BWP as the active BWP for communications by the UE 115 to improve power savings at the UE 115. For example, the default BWP may span fewer frequency resources than other BWPs, allowing the UE 115 to reduce processing resources involved in monitoring an active BWP, receiving reference signals in the active BWP, or both. The UE 115 may trigger falling back to the default BWP according to a timer (such as in response to an expiration of the timer), such as an inactivity timer. For example, the UE 115 may initiate the timer in accordance with (such as in response to) being inactive on an active BWP. Being inactive on the active BWP may involve failing to receive data or control signaling on the active BWP, refraining from transmitting on the active BWP, or both. If the timer expires, the UE 115 may fall back to the default BWP to conserve power.

However, in some implementations (such as for a low power device), using the timer expiry to trigger fallback to the default BWP may fail to optimize power savings at the UE 115. For example, if the current energy level (such as the current remaining battery life) at the UE 115 is below a threshold, waiting for timer expiry to trigger power saving operations (such as falling back to a default BWP) may cause the UE 115 to run out of power or otherwise enter a critically low power state. To improve power saving operations, the UE 115 may trigger bandwidth reduction in accordance with the energy level of the UE 115.

In some implementations, the UE 115 may switch a bandwidth size of an active BWP in accordance with the energy level of the UE 115 satisfying a threshold energy level. For example, if the current energy level of the UE 115 is below the threshold energy level, the UE 115 may reduce the bandwidth size of the active BWP to reduce the power overhead associated with operating on the active BWP at the UE 115. Additionally, or alternatively, the UE 115 may switch the active BWP from a first BWP (such as the current active BWP) to a default BWP spanning a narrower bandwidth in accordance with the energy level of the UE 115 satisfying a threshold energy level. For example, if the current energy level of the UE 115 is below the threshold energy level, the UE 115 may fall back to the default BWP. This may allow the UE 115 to switch to the default BWP earlier than if the UE 115 waited for the timer expiry. The UE 115 may indicate, to the network (such as via a network entity 105), switching the bandwidth size of the active BWP or switching the active BWP to the default BWP. Additionally, or alternatively, the UE 115 may use a configuration for the active BWP that enables faster charging at the UE 115 according to the energy level at the UE 115. For example, the energy level satisfying the threshold energy level may indicate to the UE 115, the network, or both that the UE 115 may urgently request energy (such as via RF signaling for energy harvesting from a network entity 105 or another UE 115).

Figure 2:
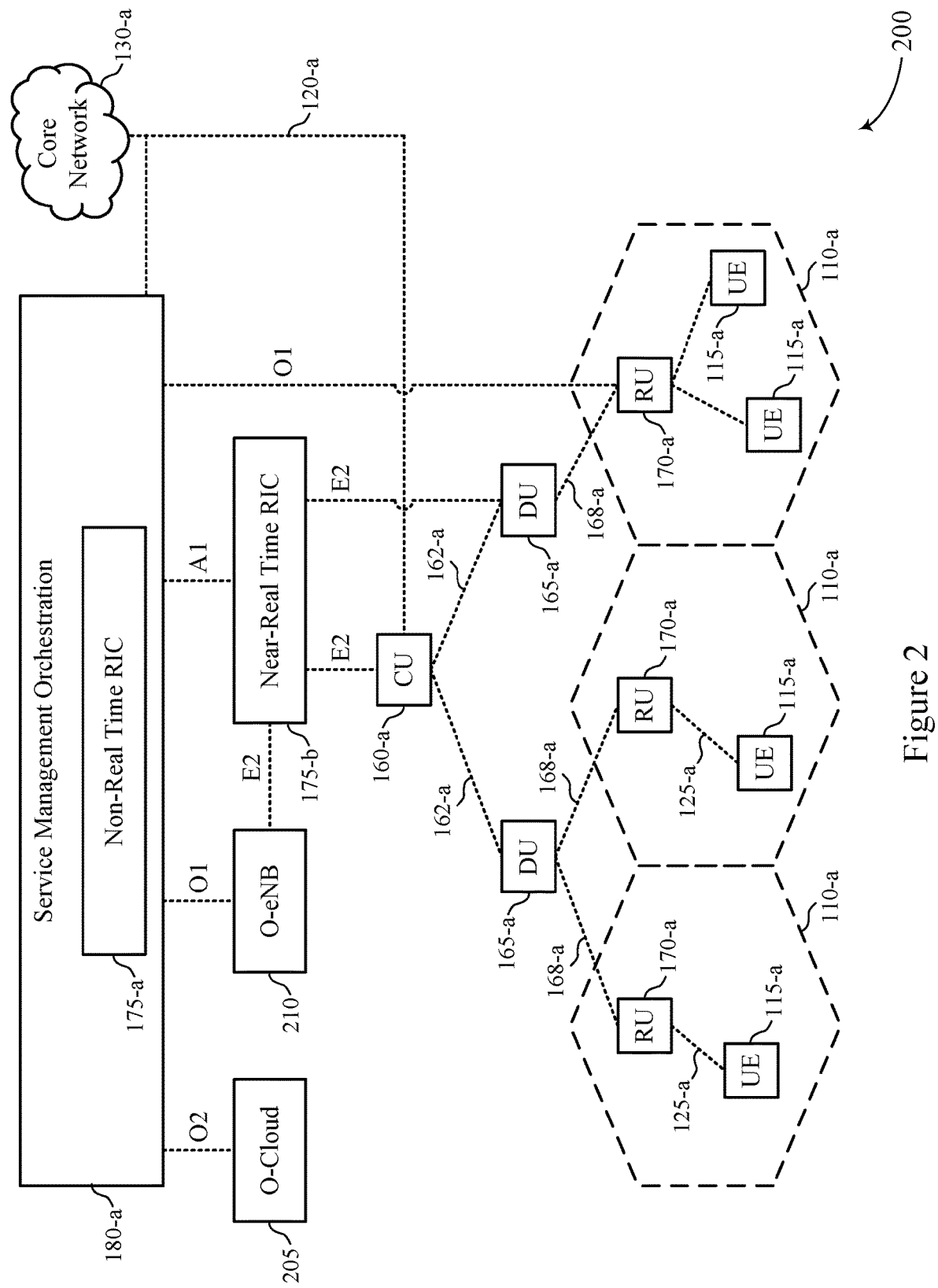
FIG. 2 shows an example network architecture that supports BWP dynamic adaptation in accordance with an energy level at a UE.

FIG. 2 shows an example network architecture 200 that supports BWP dynamic adaptation in accordance with an energy level at a UE. The network architecture 200, which may be an example of a disaggregated BS architecture or a disaggregated RAN architecture, may illustrate an example for implementing one or more aspects of the wireless communications system 100. The network architecture 200 may include one or more CUs 160-*a* that may communicate directly with a core network 130-*a* via a backhaul communication link 120-*a* or indirectly with the core network 130-*a* through one or more disaggregated network entities 105. For example, the communications may use a Near-RT RIC 175-*b* via an E2 link, or a Non-RT RIC 175-*a* associated with an SMO 180-*a* (such as an SMO Framework), or both. A CU 160-*a* may communicate with one or more DUs 165-*a* via respective midhaul communication links 162-*a* (such as an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be concurrently served by multiple RUs 170-*a*.

Each of the network entities 105 of the network architecture 200 (such as CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210, or any combination thereof) may include one or more interfaces or may be coupled with one or more interfaces configured to receive or transmit signals (such as data or other information) via a wired or wireless transmission medium. Each network entity 105, or an associated processor (such as a controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or a transceiver (such as an RF transceiver) configured to receive or transmit signals, or both, over a wireless transmission medium to one or more of the other network entities 105.

In some implementations, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (such as CU-UP), control plane functionality (such as CU-CP), or a combination thereof. In some implementations, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a* for network control and signaling.

A DU 165-*a* may correspond to a logical unit that includes one or more functions (such as BS functions or other RAN functions) to control the operation of one or more RUs 170-*a*. In some implementations, a DU 165-*a* may host, at least partially, one or more of an RLC layer, a MAC layer, and one or more aspects of a PHY layer (such as a high PHY layer, including modules for FEC encoding and decoding, scrambling, modulation and demodulation, or the like) depending on a functional split, such as those defined by the 3rd Generation Partnership Project (3GPP). In some implementations, a DU 165-*a* may further host one or more low PHY layers. Each layer may be implemented with an interface configured to communicate signals with other layers hosted by the DU 165-*a* or with control functions hosted by a CU 160-*a*.

In some implementations, lower-layer functionality may be implemented by one or more RUs 170-*a*. For example, an RU 170-*a*, controlled by a DU 165-*a*, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, in accordance with the functional split, such as a lower-layer functional split. In some such implementations, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some implementations, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (such as an O1 interface). For virtualized network entities 105, the SMO 180-*a* may be configured to interact with a cloud computing platform (such as an O-Cloud 205) to perform network entity life cycle management (such as to instantiate virtualized network entities 105) via a cloud computing platform interface (such as an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (such as via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (such as via an A1 interface) the Near-RT RIC 175-*b*. The Near-RT RIC 175-*b* may be configured to include a logical function that enables near-real-time control and optimization of RAN elements and resources via data collection and actions over an interface (such as via an E2 interface) connecting one or more CUs 160-*a*, one or more DUs 165-*a*, or both, as well as an O-eNB 210, with the Near-RT RIC 175-*b*.

In some implementations, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some implementations, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (such as reconfiguration via 01) or via generation of RAN management policies (such as A1 policies).

The network architecture 200 may support BWP dynamic adaptation according to an energy level at a UE 115-*a*. In some implementations, the network may configure the UE 115-*a* to support modifying a bandwidth size of an active BWP. Additionally, or alternatively, the network may configure the UE 115-*a* to support falling back to a default BWP according to an energy level at the UE 115-*a*. A CU 160, a DU 165, or an RU 170 may determine, ascertain, obtain, or select the configuration for the UE 115-*a*, and an RU 170 or another network entity 105 (such as a BS 140 or a component of a BS 140) may transmit control signaling to the UE 115-*a* configuring the UE 115-*a* with the configuration. In some implementations, the UE 115-*a* may transmit, to the network, an indication of a dynamic adaptation to the active BWP at the UE 115-*a* (such as modifying the bandwidth size of the active BWP or falling back to using a default BWP as the active BWP). The UE 115-*a* may transmit the indication, using control signaling or data signaling, to an RU 170 or another network entity 105 (such as a BS 140 or a component of a BS 140). The network may use the indication to align the network's communications with the UE 115-*a* in frequency (such as by communicating with the UE 115-*a* over the updated active BWP).

Figure 3:
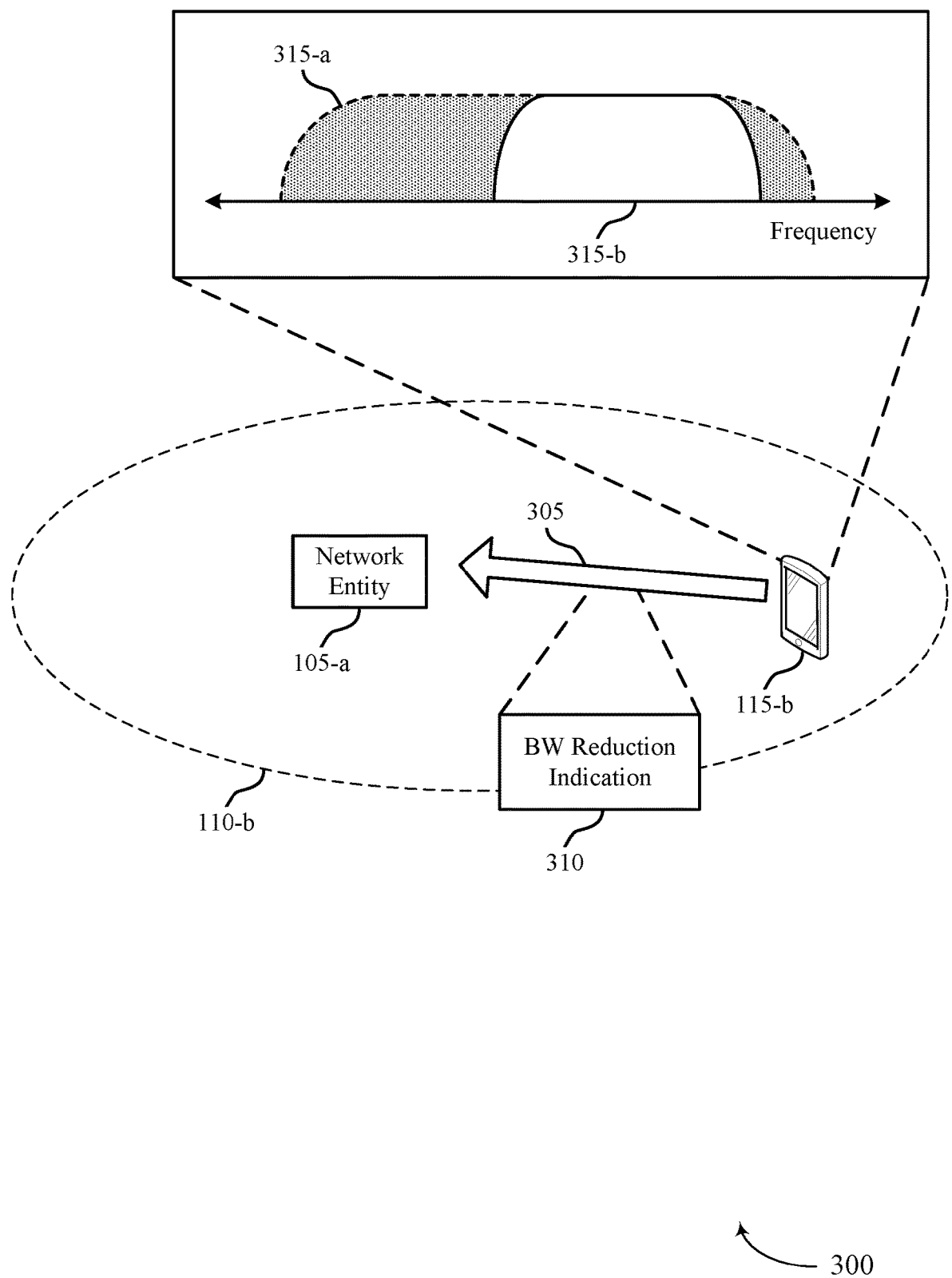
FIG. 3 shows an example signaling diagram that supports BWP dynamic adaptation in accordance with an energy level at a UE.

FIG. 3 shows an example signaling diagram 300 that supports BWP dynamic adaptation in accordance with an energy level at a UE. The signaling diagram 300 may include a wireless communications system, which may be an example of a wireless communications system 100 as described with reference to FIG. 1. In some implementations, the signaling diagram 300 may include a network architecture such as the network architecture 200 as described with reference to FIG. 2. The signaling diagram 300 may include a network entity 105-*a* and a UE 115-*b*, which may be examples of a network entity 105 and a UE 115 as described with reference to FIG. 1. The network entity 105-*a* (such as a BS or other network entity) may provide network coverage for a coverage area 110-*b*, which may be an example of a coverage area 110 as described with reference to FIG. 1. The UE 115-*b* may support power savings at the UE 115-*b* by reducing a bandwidth size of an active BWP in accordance with an energy state of the UE 115-*b*.

In some implementations, the UE 115-*b* may be an example of a passive IOT device or other device supporting energy harvesting. Such devices may operate using relatively low power and may remain charged by harvesting energy from RF signals transmitted over-the-air. The UE 115-*b* may monitor an energy level of the UE 115-*b* to determine or otherwise obtain an indication of an amount of power available at the UE 115-*b* to perform one or more operations. For example, if the current energy level of the UE 115-*b* is below a threshold (such as if the current energy level of the UE 115-*b* satisfies a threshold energy level), the UE 115-*b* may trigger one or more power saving techniques. Such power saving techniques may include modifying the active BWP of the UE 115-*b* to reduce energy consumption associated with operating according to the active BWP. For example, by reducing the bandwidth size of the active BWP, the UE 115-*b* may correspondingly reduce the amount of resources (such as processing resources at a processor of the UE 115-*b*) involved in monitoring the active BWP. The UE 115-*b* may operate according to the narrowed active BWP and corresponding reduced processing overhead until the UE 115-*b* is charged, for example, by harvesting energy such that the current energy level of the UE 115-*b* exceeds the threshold.

The UE 115-*b* may autonomously reduce the bandwidth size of the active BWP. For example, the UE 115-*b* may operate according to a first bandwidth size 315-*a* for the active BWP. The UE 115-*b* may detect that the energy level of the UE 115-*b* (such as the battery power at the UE 115-*b* or some other energy metric for the UE 115-*b*) satisfies a threshold, for example, a threshold for initiating power savings. In response to the UE 115-*b* detecting that the energy level satisfies the threshold, the UE 115-*b* may trigger a bandwidth size reduction for the active BWP. The UE 115-*b* may switch the bandwidth size of the active BWP from the first bandwidth size 315-*a* to a second bandwidth size 315-*b* in accordance with the energy level of the UE 115-*b*. The UE 115-*b* may reduce the power overhead at the UE 115-*b* by operating according to the second bandwidth size 315-*b* as compared to the first bandwidth size 315-*a*. The second bandwidth size 315-*b* may span fewer frequency resources (such as resource blocks (RBs)) in the frequency domain than the first bandwidth size 315-*a*. As such, the second bandwidth size 315-*b* may be an example of a narrower bandwidth than the first bandwidth size 315-*a*. The UE 115-*b* operating according to the second bandwidth size 315-*b* may monitor fewer resources than a UE 115 operating according to the first bandwidth size 315-*a*, effectively reducing the processing overhead at the UE 115-*b* while the energy level of the UE 115-*b* satisfies the threshold energy level. In some implementations, the UE 115-*b* may switch back from the second bandwidth size 315-*b* to the first bandwidth size 315-*a* for the active BWP if the UE 115-*b* fails to satisfy the threshold energy level (such as if the UE 115-*b* charges to an energy level above the threshold).

The UE 115-*b* may perform the bandwidth size reduction for the active BWP to maintain support for control signaling. For example, the UE 115-*b* may be configured to monitor for and receive control signaling in specific resources (such as time and frequency resources) of the active BWP. Examples of control signaling may include common control signaling for multiple UEs, UE-specific control signaling for the UE 115-*b*, or both, including synchronization signal blocks (SSBs), system information (SI), paging signaling, or any combination of these or other control signals. The first bandwidth size 315-*a* may include the resources configured for control signaling reception. The bandwidth size reduction may be performed such that the second bandwidth size 315-*b* also may include the resources configured for control signaling reception. Accordingly, the UE 115-*b* may still receive control signaling from the network (such as the network entity 105-*a*) in the configured resources after switching to the second bandwidth size 315-*b*. Although the first bandwidth size 315-*a* and the second bandwidth size 315-*b* are illustrated in FIG. 3 as contiguous in frequency, the first bandwidth size 315-*a*, the second bandwidth size 315-*b*, or both may be non-contiguous in frequency (such as spanning multiple subsets of frequency resources in the frequency domain).

The UE 115-*b* may reduce the size of the active BWP in the uplink, the downlink, or both. In some implementations, the UE 115-*b* may support the bandwidth size reduction in accordance with a configuration of the UE 115-*b*. For example, the UE 115-*b* may store a configuration supporting the bandwidth size reduction for the active BWP. Additionally, or alternatively, the UE 115-*b* may receive control signaling (such as RRC signaling, a MAC control element (CE), or other control signaling) from the network entity 105-*a* indicating a configuration for the UE 115-*b* to support the bandwidth size reduction for the active BWP. The control signaling may set one or more parameters for the UE 115-*b* to reduce the active BWP. In some implementations, the configuration may include respective bandwidth reduction information for multiple BWPs configured at the UE 115-*b*. For example, the UE 115-*b* may support multiple BWPs that may be activated as one or more active BWPs. The UE 115-*b* may store, for a BWP, a reduced bandwidth size supported by the UE 115-*b*.

The UE 115-*b* may indicate the bandwidth size switch to the network. For example, the UE 115-*b* may transmit a bandwidth reduction indication 310 to the network entity 105-*a* via an uplink channel 305. In some implementations, the UE 115-*b* may transmit the bandwidth reduction indication 310 prior to switching the bandwidth size of the active BWP. In some other implementations, the UE 115-*b* may switch the bandwidth size of the active BWP and may transmit the bandwidth reduction indication 310 in response to switching the bandwidth size of the active BWP.

In some implementations, the bandwidth reduction indication 310 may be transmitted in UE-assistance information. For example, the UE 115-*b* may transmit an RRC indication in accordance with UE-assistance information. The UE-assistance information may include an information element (IE) (such as within power saving parameters, bandwidth reduction parameters, or some combination thereof) corresponding to the bandwidth reduction indication 310, such as a low power IOT bandwidth reduction. Additionally, or alternatively, the UE 115-*b* may transmit the bandwidth reduction indication 310 in Layer 2 (L2) signaling. For example, the UE 115-*b* may transmit a MAC-CE including an indication of reduced frequency resources within the active BWP for one or more component carriers. Additionally, or alternatively, the UE 115-*b* may transmit the bandwidth reduction indication 310 in Layer 1 (L1) signaling. For example, the UE 115-*b* may transmit uplink control information (UCI) indicating the reduction of bandwidth size for the active BWP.

The bandwidth reduction indication 310 (such as an IE in UE-assistance information, RRC signaling, MAC-CE signaling, UCI, or some combination thereof) may be an example of a 1-bit flag or a multi-bit field. For example, the bandwidth reduction indication 310 may be a 1-bit flag indicating either bandwidth size reduction of the active BWP using a first bit value (such as 1) or no bandwidth size reduction using a second bit value (such as 0). Alternatively, the bandwidth reduction indication 310 may be a multi-bit field indicating the frequency resources for the reduced bandwidth size of the active BWP. In some implementations, the multi-bit field may indicate a configured reduction of BWP frequency resources (such as from a set of multiple configurations provided by the network to the UE 115-*b*). For example, the network entity 105-*a* may configure the UE 115-*b* with a set of multiple configurations for reduced bandwidth sizes corresponding to respective identifiers (IDs) (such as bandwidth IDs), and the UE 115-*b* may indicate an ID for one configuration from the set of multiple configurations in the multi-bit field. In some other implementations, the multi-bit field may indicate a set of frequency resources for the second bandwidth size 315-*b* using a bit map.

Additionally, or alternatively, the UE 115-*b* may request to perform the bandwidth switch. For example, the bandwidth reduction indication 310 may be an example of a request message that requests the network to allow the UE 115-*b* to switch the bandwidth size of the active BWP at the UE 115-*b*. The UE 115-*b* may receive, from the network (such as via the network entity 105-*a*), a message in response to the request either confirming or denying the switch. In some implementations, if the network confirms the switch, the UE 115-*b* may switch from the first bandwidth size 315-*a* to the second bandwidth size 315-*b* for the active BWP in response to the confirmation. In some other implementations, if the network denies the switch, the UE 115-*b* may refrain from switching the bandwidth size of the active BWP.

Additionally, or alternatively, the UE 115-*b* may support bandwidth size reduction using sidelink signaling. For example, the UE 115-*b* may be configured for bandwidth size reduction by another UE 115 via sidelink signaling (such as sidelink control signaling). The UE 115-*b* may reduce the bandwidth size of an active BWP for sidelink signaling, for example, for sidelink transmission, sidelink reception, or both. In some implementations, the UE 115-*b* may select the bandwidth size of the active BWP for a specific resource pool of a set of multiple resource pools configured for sidelink communications. Additionally, or alternatively, the UE 115-*b* may transmit the bandwidth reduction indication 310 via sidelink signaling (such as sidelink control information (SCI) or sidelink data) to another UE 115. The other UE 115 may forward the bandwidth reduction indication 310 to the network (such as via the network entity 105-*a*) or may process the bandwidth reduction indication 310 at the other UE 115, for example, to adjust an active BWP for sidelink communications between the other UE 115 and the UE 115-*b*.

Figure 4:
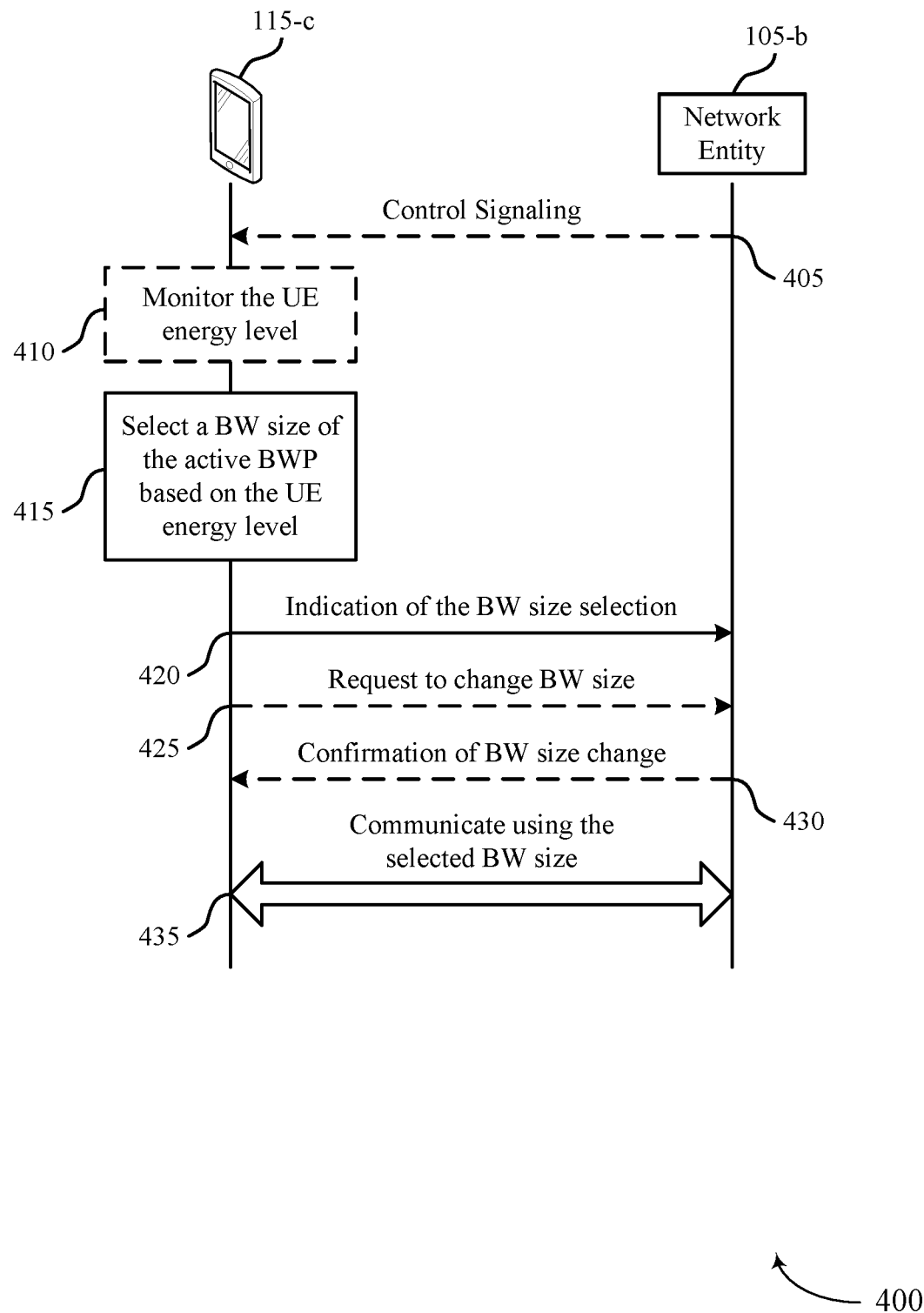
FIG. 4 shows an example process flow that supports BWP dynamic adaptation in accordance with an energy level at a UE.

FIG. 4 shows an example process flow 400 that supports BWP dynamic adaptation in accordance with an energy level at a UE. The process flow 400 may implement or be implemented by aspects of a wireless communications system 100 or a network architecture 200 as described with reference to FIGS. 1 and 2. The process flow 400 may illustrate processes performed within a signaling diagram 300 as described with reference to FIG. 3. The process flow 400 may include a UE 115-*c* and a network entity 105-*b* (such as a BS, a network node, or a system of multiple network nodes), which may be examples of a UE 115 and a network entity 105 as described herein with reference to FIGS. 1-3. The UE 115-*c* may reduce the bandwidth size of an active BWP in accordance with an energy level at the UE 115-*c*. In the following description of the process flow 400, the operations performed by the UE 115-*c* and the network entity 105-*b* may be performed in different orders or at different times. Additionally, or alternatively, some operations may be omitted from the process flow 400, and other operations may be added to the process flow 400. Some or all of the operations described with respect to the network entity 105-*b* may alternatively be performed by another UE 115, for example, in sidelink implementations.

At 405, the network entity 105-*b* may transmit, to the UE 115-*c*, control signaling configuring the UE 115-*c* to support reducing the bandwidth size of the UE's active BWP. For example, the control signaling may configure the UE 115-*c* to support switching the bandwidth size of the active BWP in accordance with an energy level of the UE 115-*c* satisfying a threshold energy level. The control signaling may be an example of RRC signaling, a MAC-CE, downlink control information (DCI), SCI, or any combination thereof. In some implementations, the control signaling may indicate a set of multiple configurations for reducing BWPs (such as configurations defining the specific frequency resources for a reduced BWP). A configuration of the set of multiple configurations may correspond to a respective BWP of a set of multiple BWPs configured for the UE 115-c.

At 410, the UE 115-c may monitor the current energy level at the UE 115-c. For example, the UE 115-c may monitor a battery life at the UE 115-c to determine or otherwise select whether to trigger power saving operations. In some implementations, the UE 115-c may compare the current energy level at the UE 115-c to a threshold energy level. If the current energy level satisfies the threshold energy level (such as the current energy level being less than the threshold energy level), the UE 115-c may trigger one or more power saving operations, such as reducing the bandwidth size of the active BWP. If the current energy level at the UE 115-c fails to satisfy the threshold energy level (such as the current energy level exceeding the threshold energy level), the UE 115-c may operate according to normal operating parameters. The threshold energy level may be stored at the UE 115-c, dynamically determined or selected by the UE 115-c, configured by the network (such as via control signaling), or some combination thereof.

At 415, the UE 115-c may select a bandwidth size of the active BWP in accordance with the energy level of the UE 115-c (such as the monitored current energy level) satisfying the threshold energy level. For example, the UE 115-c may reduce—or otherwise switch—the bandwidth size of the active BWP to reduce the processing overhead at the UE 115-c. Reducing the bandwidth size of the active BWP may not involve changing the active BWP. That is, the BWP ID of the active BWP may remain the same (such that the UE 115-c refrains from modifying the active BWP), but the UE 115-c may operate according to a different set of frequency resources for the same active BWP. The active BWP may be configured for uplink transmission, downlink reception, sidelink transmission, sidelink reception, or any combination thereof for the UE 115-c. In some implementations, the UE 115-c may modify the bandwidth size from a first set of frequency resources (such as the first bandwidth size 315-a as described with reference to FIG. 3) to a second set of frequency resources (such as the second bandwidth size 315-b as described with reference to FIG. 3). The second set of frequency resources may span fewer frequency resources than the first set of frequency resources. Additionally, the second set of frequency resources may support, at the UE 115-c, reception of control signaling configured for the active BWP. For example, the second set of frequency resources may include searching occasions for SSBs, SI, paging signals, or any combination of these or other control signals.

At 420, the UE 115-c may transmit (such as to the network entity 105-b) an indication that that bandwidth size of the active BWP is selected. In some implementations, the UE 115-c may transmit the indication prior to switching the bandwidth size of the active BWP. In some other implementations, the UE 115-c may transmit the indication following (such as in response to) switching the bandwidth size of the active BWP. In some implementations, the indication that the bandwidth size of the active BWP is selected may be transmitted, by the UE 115-c, in UE-assistance information, RRC signaling, a MAC-CE, UCI, SCI, physical sidelink feedback channel (PSFCH) signaling, or any combination thereof. The indication may be an example of a bit indicating that the bandwidth size of the active BWP is selected, an example of a bit map indicating a configuration selected for the bandwidth size of the active BWP from a set of multiple configurations, an example of a bit map indicating a set of resources corresponding to the selected bandwidth size of the active BWP, or any combination thereof.

In some implementations, the indication that the bandwidth size of the active BWP is selected may be transmitted as part of a request to reduce the bandwidth size of the active BWP. For example, prior to switching the bandwidth size of the active BWP, at 425, the UE 115-c may transmit, to the network entity 105-b, the request to change the bandwidth size of the active BWP. At 430, the network entity 105-b may transmit, to the UE 115-c and in response to the request, a confirmation to reduce the bandwidth size of the active BWP. In some implementations, the request may indicate the current energy level of the UE 115-c, such that the network may determine or otherwise select whether to command the UE 115-c to switch the bandwidth size of the active BWP in accordance with the UE's current energy level. In some such implementations, the confirmation message may be an example of a network command indicating for the UE 115-c to switch the bandwidth size of the active BWP due to the indicated energy level of the UE. The UE 115-c may switch the bandwidth size of the active BWP in response to receiving the confirmation from the network entity 105-b.

At 435, the UE 115-c may communicate with the network entity 105-b using the selected bandwidth size of the active BWP. For example, the UE 115-c may communicate using the reduced bandwidth size in accordance with the indication that the bandwidth size of the active BWP is selected, in accordance with switching the bandwidth size of the active BWP, or both. For the communications, the network (such as via the network entity 105-b) may assign signaling to the UE 115-c to one or more frequency resources within the set of frequency resources of the selected bandwidth size for the active BWP. The assigned signaling may include physical downlink control channel (PDCCH) signaling, physical downlink shared channel (PDSCH) signaling, or both. Additionally, or alternatively, another UE communicating with the UE 115-c using the reduced size of the active BWP may assign physical sidelink control channel (PSCCH) signaling, physical sidelink shared channel (PSSCH) signaling, or both to the frequency resources of the selected bandwidth size.

Figure 5:
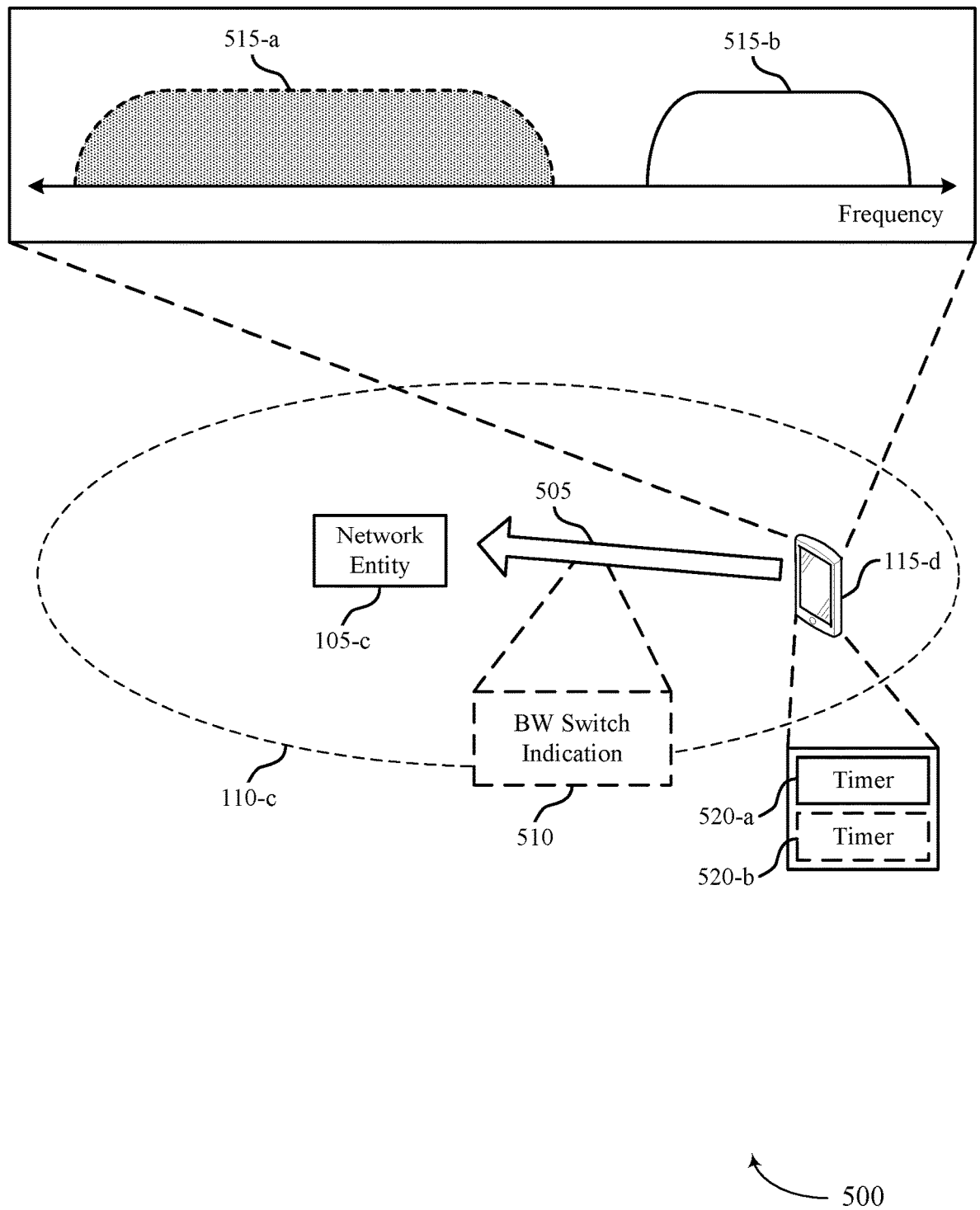
FIG. 5 shows an example signaling diagram that supports BWP dynamic adaptation in accordance with an energy level at a UE.

FIG. 5 shows an example signaling diagram 500 that supports BWP dynamic adaptation in accordance with an energy level at a UE. The signaling diagram 500 may include a wireless communications system, which may be an example of a wireless communications system 100 as described with reference to FIG. 1. In some implementations, the signaling diagram 500 may include a network architecture such as the network architecture 200 as described with reference to FIG. 2. The signaling diagram 500 may include a network entity 105-c and a UE 115-d, which may be examples of a network entity 105 and a UE 115 as described with reference to FIGS. 1-4. The network entity 105-c (such as a BS or other network entity) may provide network coverage for a coverage area 110-c, which may be an example of a coverage area 110 as described with reference to FIG. 1. The UE 115-d may support power savings at the UE 115-d by falling back to use a default BWP as an active BWP in accordance with an energy state of the UE 115-d.

The UE 115-d may store a set of multiple BWPs supported for communications by the UE 115-d. For example, the UE 115-d may activate a BWP for one or more types of communications (such as uplink transmission, downlink reception, sidelink transmission, sidelink reception, or any combination thereof). Additionally, the UE 115-d may configure one BWP as a "default" BWP. The UE 115-d may store an indicator for the BWP that marks the BWP as the default BWP for the UE 115-d. If the UE 115-d falls back to a BWP or otherwise resets the active BWP, the UE 115-*d* may switch to the default BWP as the active BWP at the UE 115-*d*. In some implementations, the default BWP may span fewer frequency resources than the other BWPs. Accordingly, falling back to the default BWP may allow the UE 115-*d* to operate using relatively fewer frequency resources, effectively reducing the processing overhead at the UE 115-*d* associated with communicating (such as monitoring for transmissions, receiving reference signals, or the like) over the active BWP.

In some implementations, the UE 115-*d* may use a timer 520-*a* to determine or otherwise select when to fall back to the default BWP. The UE 115-*d* may activate the timer 520-*a* in response to being inactive on the active BWP. For example, the UE 115-*d* may operate using a first BWP 515-*a* as the active BWP. The UE 115-*d* may fail to receive control or data signaling on the active BWP and may refrain from transmitting on the active BWP, causing the UE 115-*d* to activate the timer 520-*a*. The timer 520-*a* may be configured with a time duration. If the timer 520-*a* runs for the time duration, the timer 520-*a* may expire and the UE 115-*d* may fall back from the using the first BWP 515-*a* as the active BWP to using the default BWP 515-*b* as the active BWP. Because the first BWP 515-*a* may span a greater quantity of frequency resources than the default BWP 515-*b*, the UE 115-*d* may achieve power savings by falling back from the first BWP 515-*a* to the default BWP 515-*b*.

In some implementations, waiting for the timer 520-*a* to expire before falling back to the default BWP 515-*b* may result in inefficiencies at a UE 115. For example, if the UE 115 is an example of a passive IOT device or other relatively low power device, the UE 115 may potentially run out of battery if the UE 115 continues operating using the first BWP 515-*a* while the timer 520-*a* is running.

The UE 115-*d* may use the energy state of the UE 115-*d* to trigger fallback to the default BWP 515-*b*. For example, the UE 115-*d* may support an energy-based trigger—additional, or alternative, to a timer-based trigger—for falling back to the default BWP 515-*b* for energy savings. The UE 115-*d* may monitor the current energy level (such as the remaining battery life) of the UE 115-*d* to determine or otherwise select whether to fall back to the default BWP 515-*b*. For example, the UE 115-*d* may compare the current energy level of the UE 115-*d* to a threshold energy level. If the current energy level satisfies the threshold energy level (such as the current energy level being less than the threshold energy level), the UE 115-*d* may fall back to using the default BWP 515-*b* as the active BWP. If the current energy level fails to satisfy the threshold energy level (such as the current energy level exceeding the threshold energy level), the UE 115-*d* may continue operating using a first BWP 515-*a* as the active BWP or may activate a BWP to use as the active BWP, for example, if the UE 115-*d* is currently using the default BWP 515-*b* as the active BWP. By triggering fallback to the default BWP 515-*b* according to the energy level of the UE 115-*d*, the UE 115-*d* may fall back to the default BWP 515-*b* prior to expiration of the timer 520-*a*. Falling back prior to expiration of the timer 520-*a* may reduce energy consumption at the UE 115-*d* (such as for implementations where the UE 115-*d* is power-constrained or otherwise operating in a power saving mode).

In some implementations, the UE 115-*d* may fall back to the default BWP 515-*b* in accordance with a combination of the timer 520-*a* and the energy level of the UE 115-*d*. For example, the UE 115-*d* may fall back if the energy level of the UE 115-*d* satisfies the threshold energy level and a remaining time for the timer 520-*a* satisfies a threshold time. If the timer 520-*a* is initiated, the timer 520-*a* may run for a time duration before expiring. The UE 115-*d* may determine or otherwise select to fall back to the default BWP 515-*b* if the timer 520-*a* is running but still has greater than a threshold time remaining before expiring due to the energy level of the UE 115-*d* being less than the threshold energy level (such as if the UE 115-*d* does not have enough power remaining to wait the remaining time for expiry of the timer 520-*a* to fall back).

The network may configure the UE 115-*d* to fall back to the default BWP 515-*b* in accordance with the energy level of the UE 115-*d*. In some implementations, the network entity 105-*c* may transmit, to the UE 115-*d*, control signaling configuring the UE 115-*d* to support falling back to using the default BWP 515-*b* as the active BWP if the energy level of the UE 115-*d* satisfies a threshold energy level. The control signaling may be an example of RRC signaling, a MAC-CE, DCI, or any combination thereof. In some implementations, the control signaling may further configure the UE 115-*d* with one or more parameters for switching in accordance with the timer 520-*a*. For example, the UE 115-*d* may be configured to switch to the default BWP 515-*b* if the remaining active time for the timer 520-*a* exceeds a first threshold and the energy level of the UE 115-*d* is below a second threshold.

In some implementations, the UE 115-*d* may transmit a bandwidth switch indication 510 to the network (such as via the network entity 105-*c*) on an uplink channel 505. The bandwidth switch indication 510 may indicate that the UE 115-*d* is switching from using a first BWP 515-*a* as the active BWP to using a default BWP 515-*b* as the active BWP. In some implementations, the UE 115-*d* may transmit the bandwidth switch indication 510 prior to falling back to the default BWP 515-*b*. In some other implementations, the UE 115-*d* may fall back to the default BWP 515-*b* and, in response to falling back, may transmit the bandwidth switch indication 510 to the network. The bandwidth switch indication 510 may be transmitted in control signaling such as UE-assistance information, RRC signaling, a MAC-CE, UCI, or any combination thereof. The network (such as via the network entity 105-*c*) may communicate with the UE 115-*d* over the default BWP 515-*b* according to the received bandwidth switch indication 510.

In some implementations, the bandwidth switch indication 510 may further indicate when the UE 115-*d* switches from the first BWP 515-*a* to the default BWP 515-*b* (such as indicating a timestamp, a remaining time on the timer 520-*a* prior to expiry, a symbol, a slot, a TTI, or any other timing indication). If the network transmitted signaling to the UE 115-*d* using the first BWP 515-*a* after the UE 115-*d* performed the switch—such as according to the indicated time at which the UE 115-*d* switched to the default BWP 515-*b*—the network may retransmit the signaling to the UE 115-*d* using the default BWP 515-*b* according to the switch of the active BWP at the UE 115-*d*.

In some implementations, the UE 115-*d* may transmit the bandwidth switch indication 510 as part of a request to switch the active BWP. For example, the request may be an example of control signaling, such as RRC signaling, a MAC-CE, UCI, or any combination thereof. The network (such as via the network entity 105-*c*) may receive the request and determine or otherwise select whether to trigger the UE 115-*d* to fall back to the default BWP 515-*b* in accordance with the request. For example, the request may indicate the current energy level of the UE 115-*d*, and the network may determine or otherwise select to trigger the UE 115-*d* to fall back to the default BWP 515-*b* in accordance with the indicated current energy level of the UE 115-d. The network may transmit confirmation signaling (such as control signaling) to the UE 115-d to fall back to the default BWP 515-b, and the UE 115-d may switch the active BWP from the first BWP 515-a to the default BWP 515-b in response to the confirmation signaling. In some implementations, the confirmation signaling may include a command to switch the active BWP.

The UE 115-d may use multiple timers in accordance with different energy states of the UE 115-d. For example, the UE 115-d may use a first timer 520-a for falling back to the default BWP 515-b if the energy level of the UE 115-d fails to satisfy a threshold energy level (such as being greater than the threshold energy level), and the UE 115-d may use a second timer 520-b for falling back to the default BWP 515-b if the energy level of the UE 115-d satisfies the threshold energy level (such as being less than the threshold energy level). If the UE 115-d determines or otherwise ascertains that the current energy level of the UE 115-d satisfies the threshold energy level, the UE 115-d may activate the second timer 520-b in accordance with inactivity on the current active BWP (such as the first BWP 515-a). The UE 115-d may fall back from the first BWP 515-a to the default BWP 515-b in response to expiry of the second timer 520-b. A time duration of the second timer 520-b may be relatively shorter than a time duration of the first timer 520-a, such that the UE 115-d may fall back to the default BWP 515-b relatively more quickly if the UE 115-d is using the second timer 520-b (such as when the energy level of the UE 115-d is below a threshold) as compared to if the UE 115-d is using the first timer 520-a (such as when the energy level of the UE 115-d is above the threshold). Additionally, or alternatively, the UE 115-d may store multiple different timers (such as more than two timers) corresponding to multiple different energy states at the UE 115-d. The UE 115-d may fall back according to different timelines in accordance with different amounts of battery power remaining (indicated by the energy level) at the UE 115-d using the multiple different timers.

Additionally, or alternatively, the UE 115-d may support falling back to the default BWP 515-b according to an energy level of the UE 115-d using sidelink signaling. For example, the UE 115-d may be configured for falling back to the default BWP 515-b according to the UE's energy level by another UE 115 via sidelink signaling (such as sidelink control signaling). The UE 115-d may switch to using the default BWP 515-b as the active BWP for sidelink signaling, for example, for sidelink transmission, sidelink reception, or both. In some implementations, the UE 115-d may fall back to the default BWP 515-b for the active BWP for a specific resource pool of a set of multiple resource pools configured for sidelink communications. Additionally, or alternatively, the UE 115-d may transmit the bandwidth switch indication 510 via sidelink signaling (such as SCI or sidelink data) to another UE 115. The other UE 115 may forward the bandwidth switch indication 510 to the network (such as via the network entity 105-c) or may process the bandwidth switch indication 510 at the other UE 115, for example, to switch an active BWP for sidelink communications between the other UE 115 and the UE 115-d.

Figure 6:
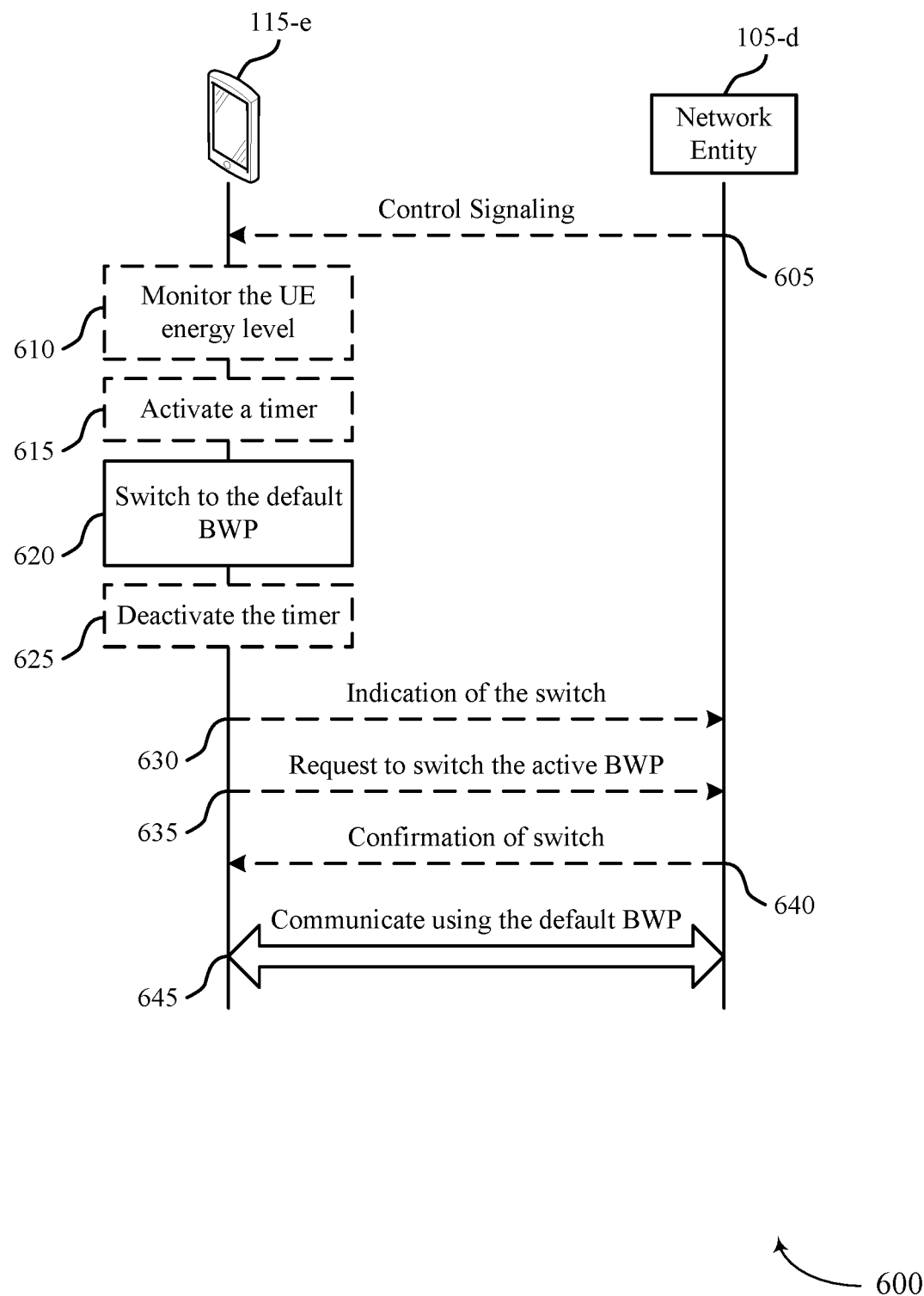
FIG. 6 shows an example process flow that supports BWP dynamic adaptation in accordance with an energy level at a UE.

FIG. 6 shows an example process flow 600 that supports BWP dynamic adaptation in accordance with an energy level at a UE. The process flow 600 may implement or be implemented by aspects of a wireless communications system 100 or a network architecture 200 as described with reference to FIGS. 1 and 2. The process flow 600 may illustrate processes performed within a signaling diagram 500 as described with reference to FIG. 5. The process flow 600 may include a UE 115-e and a network entity 105-d (such as a BS, a network node, or a system of multiple network nodes), which may be examples of a UE 115 and a network entity 105 as described herein with reference to FIGS. 1-5. The UE 115-e may fall back to a default BWP in accordance with an energy level at the UE 115-e. In the following description of the process flow 600, the operations performed by the UE 115-e and the network entity 105-d may be performed in different orders or at different times. Additionally, or alternatively, some operations may be omitted from the process flow 600, and other operations may be added to the process flow 600. Some or all of the operations described with respect to the network entity 105-d may alternatively be performed by another UE 115, for example, in sidelink implementations.

At 605, the network entity 105-d may transmit control signaling to the UE 115-e to configure the UE 115-e to support falling back to a default BWP according to an energy level of the UE 115-e. For example, in accordance with the configuration, the UE 115-e may switch an active BWP from a first BWP (such as the first BWP 515-a described with reference to FIG. 5) to a default BWP (such as the default BWP 515-b described with reference to FIG. 5) prior to expiration of a timer for falling back to the default BWP (such as a timer associated with falling back during normal operations, as opposed to low power operations).

At 610, the UE 115-e monitor the current energy level at the UE 115-e. For example, the UE 115-e may monitor a battery life at the UE 115-e to determine or otherwise select whether to trigger power saving operations. In some implementations, the UE 115-e may compare the current energy level at the UE 115-e to a threshold energy level. If the current energy level satisfies the threshold energy level (such as the current energy level being less than the threshold energy level), the UE 115-e may trigger one or more power saving operations, such as switching the active BWP to a default BWP. If the current energy level at the UE 115-e fails to satisfy the threshold energy level (such as the current energy level exceeding the threshold energy level), the UE 115-e may operate according to normal operating parameters. The threshold energy level may be stored at the UE 115-e, dynamically determined or otherwise selected by the UE 115-e, configured by the network (such as via control signaling), or some combination thereof.

At 615, the UE 115-e may activate a timer for falling back to the default BWP. In some implementations, the UE 115-e may initialize a first timer for falling back to the default BWP in normal operating conditions (such as if the energy level of the UE 115-e is above a threshold energy level), where the UE 115-e may fall back to the default BWP prior to expiration of the first timer if the energy level of the UE 115-e is below the threshold energy level. Additionally, or alternatively, the UE 115-e may initialize a second timer for falling back to the default BWP in power saving conditions (such as if the energy level of the UE 115-e is below the threshold energy level or otherwise satisfies the threshold energy level). A duration of the second timer may be shorter than a duration of the first timer.

At 620, the UE 115-e may switch an active BWP of the UE 115-e in accordance with an energy level of the UE 115-e. The UE 115-e may switch the active BWP from a first BWP to the default BWP, for example, prior to an expiration of a timer for falling back to the default BWP (such as the first timer for falling back to the default BWP under normal operating conditions). The default BWP may span fewer frequency resources than the first BWP. The default BWP, the first BWP, or both may span a contiguous set of frequency resources or may span multiple non-contiguous sets of frequency resources. Additionally, or alternatively, the default BWP and the first BWP may overlap (partially or fully) in the frequency domain or may span mutually exclusive frequency resources. The UE 115-e may switch the active BWP in accordance with the energy level of the UE 115-e satisfying the threshold energy level (such as the energy level of the UE 115-e being below the threshold energy level). Additionally, or alternatively, the UE 115-e may switch the active BWP further in accordance with a charging rate of the UE satisfying a threshold charging rate (such as being below a threshold charging rate). For example, if the charging rate, or an average charging rate, of the UE 115-e does not exceed an average power output by the UE 115-e (such as to support operations using the first BWP as the active BWP), the UE 115-e may trigger falling back to using the default BWP as the active BWP to improve the net power input at the UE 115-e. The net power input may correspond to the charging rate of the UE 115-e minus the power output by the UE 115-e.

In some implementations, the UE 115-e may switch the active BWP to the default BWP in accordance with an expiration of a timer (such as the second timer for falling back in power saving conditions). In some implementations, the UE 115-e may switch the active BWP to the default BWP further in accordance with a remaining active time for a timer (such as the first timer) for falling back to the default BWP satisfying a threshold remaining active time (such as exceeding the threshold remaining active time). Additionally, or alternatively, at 625, the UE 115-e may deactivate a timer (such as the first timer) for falling back to the default BWP in accordance with the switching and prior to the expiration of the timer.

At 630, the UE 115-e may transmit an indication of switching the active BWP from the first BWP to the default BWP. In some implementations, the UE 115-e may transmit the indication prior to switching the active BWP. In some other implementations, the UE 115-e may switch the active BWP and may transmit the indication in response to performing the switch. The indication may further include an indication of when the switching occurred. In some implementations, the UE 115-e may transmit the indication in control signaling, such as RRC signaling, a MAC-CE, UCI, or any combination thereof.

At 635, the UE 115-e may transmit a request to switch the active BWP from the first BWP to the default BWP. The network (such as via the network entity 105-d) may receive the request and, at 640, may transmit, in response to the request, a confirmation for the UE 115-e to switch the active BWP from the first BWP to the default BWP. The confirmation may be an example of control signaling or a command, such as RRC signaling, a MAC-CE, DCI, or other control signaling. The UE 115-e may receive the confirmation and switch the active BWP from the first BWP to the default BWP in accordance with (such as in response to) the received confirmation.

At 645, the UE 115-e may communicate with the network (such as the network entity 105-d) using the default BWP as the active BWP, for example, according to the switch.

Figure 7:
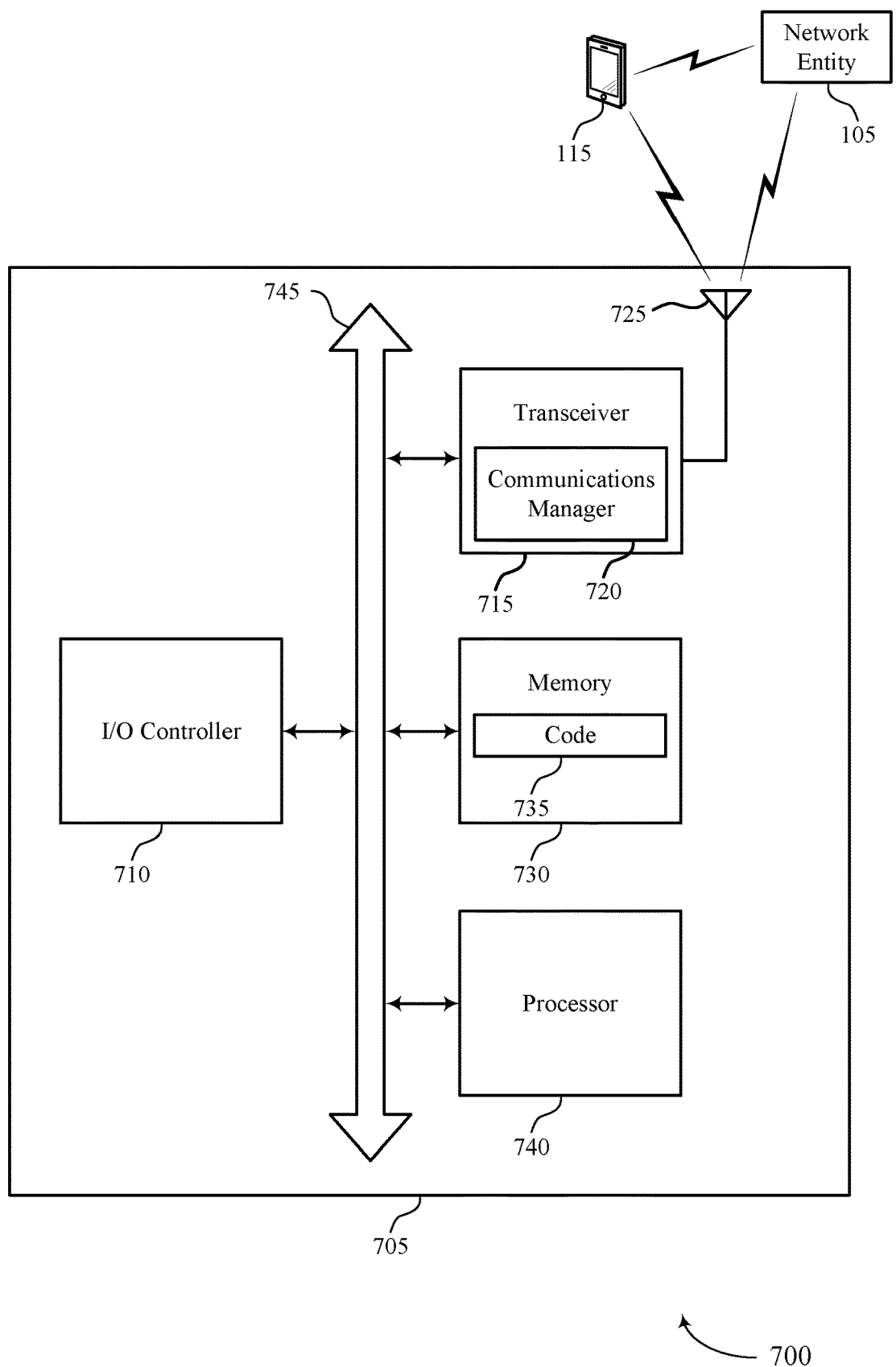
FIGS. 7 and 8 show block diagrams of example devices that support BWP dynamic adaptation in accordance with an energy level at a UE.

FIG. 7 shows a block diagram 700 of an example device 705 that supports BWP dynamic adaptation in accordance with an energy level at a UE. The device 705 may communicate with one or more network entities 105 (such as one or more components of one or more BSs), one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (such as coupled operatively, communicatively, functionally, electronically, or electrically) via one or more buses, such as a bus 745.

The I/O controller 710 may manage input and output signals for the device 705. The I/O controller 710 also may manage peripherals not integrated into the device 705. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some implementations, the I/O controller 710 may be implemented as part of a processor, such as the processor 740. A user may interact with the device 705 via the I/O controller 710 or via hardware components controlled by the I/O controller 710.

In some implementations, the device 705 may include a single antenna 725. However, in some other implementations, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer, when compiled and executed, to perform functions described herein. In some implementations, the memory 730 may include, among other things, a basic I/O system (BIOS) which may control basic hardware or software operation such as the interaction with peripheral components or devices.

The processor 740 may include an intelligent hardware device (such as a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some implementations, the processor 740 may be configured to operate a memory array using a memory controller. In some other implementations, a memory controller may be integrated into the processor 740. The processor 740 may be configured to execute computer-readable instructions stored in a memory (such as the memory 730) to cause the device 705 to perform various functions (such as functions or tasks supporting BWP dynamic adaptation in accordance with an energy level at a UE 115). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for selecting a bandwidth size of an active BWP in accordance with an energy level of the UE satisfying a threshold energy level. The communications manager 720 may be configured as or otherwise support a means for switching the active BWP from a first bandwidth size to the selected bandwidth size. The communications manager 720 may be configured as or otherwise support a means for transmitting an indication that the bandwidth size of the active BWP is selected.

In some implementations, the communications manager 720 may be configured as or otherwise support a means for communicating using the selected bandwidth size of the active BWP in accordance with the indication and the switching.

In some implementations, the indication that the bandwidth size of the active BWP is selected includes a request to reduce the bandwidth size of the active BWP. In some such implementations, the communications manager 720 may be configured as or otherwise support a means for receiving, in response to the request, a confirmation to reduce the bandwidth size of the active BWP, where the active BWP is switched from the first bandwidth size to the selected bandwidth size in accordance with the received confirmation. In some implementations, the request indicates the energy level of the UE.

In some implementations, the communications manager 720 may be configured as or otherwise support a means for receiving control signaling configuring the UE to support selecting the bandwidth size of the active BWP in accordance with the energy level of the UE satisfying the threshold energy level, where the bandwidth size of the active BWP is selected according to the control signaling. In some implementations, the control signaling indicates a set of multiple configurations for reducing BWPs, a configuration of the set of multiple configurations corresponding to a respective BWP of a set of multiple BWPs configured for the UE. In some implementations, the control signaling includes RRC signaling, a MAC CE, DCI, SCI, or any combination thereof.

In some implementations, to support switching the active BWP from the first bandwidth size to the selected bandwidth size, the communications manager 720 may be configured as or otherwise support a means for modifying the bandwidth size of the active BWP from a first set of frequency resources to a second set of frequency resources, the second set of frequency resources including fewer frequency resources than the first set of frequency resources, and the second set of frequency resources supporting reception of control signaling configured for the active BWP. In some implementations, the second set of frequency resources includes searching occasions for SSBs, SI, paging signals, or any combination thereof.

In some implementations, the communications manager 720 may be configured as or otherwise support a means for monitoring a current energy level of the UE, where the energy level of the UE satisfying the threshold energy level includes the current energy level of the UE being below the threshold energy level. In some implementations, the communications manager 720 may be configured as or otherwise support a means for triggering the selecting the bandwidth size of the active BWP in accordance with the current energy level of the UE being below the threshold energy level.

In some implementations, the indication that the bandwidth size of the active BWP is selected is transmitted in UE assistance information, RRC signaling, a MAC CE, UCI, SCI, PSFCH signaling, or any combination thereof.

In some implementations, the indication that the bandwidth size of the active BWP is selected includes a bit indicating that the bandwidth size of the active BWP is selected, a bit map indicating a configuration selected for the bandwidth size of the active BWP from a set of multiple configurations, a bit map indicating a set of resources corresponding to the selected bandwidth size of the active BWP, or any combination thereof.

In some implementations, the bandwidth size of the active BWP is selected for a resource pool of a set of multiple resource pools for sidelink communications. In some implementations, the active BWP is configured for uplink transmission, downlink reception, sidelink transmission, sidelink reception, or any combination thereof.

Additionally, or alternatively, the communications manager 720 may support wireless communications at a UE in accordance with examples as disclosed herein. For example, the communications manager 720 may be configured as or otherwise support a means for switching an active BWP from a first BWP to a default BWP prior to an expiration of a timer for falling back to the default BWP. The switching the active BWP may be in accordance with an energy level of the UE satisfying a threshold energy level. The communications manager 720 may be configured as or otherwise support a means for communicating using the default BWP as the active BWP.

In some implementations, the communications manager 720 may be configured as or otherwise support a means for initializing the timer for falling back to the default BWP in response to inactivity on the active BWP by the UE. In some such implementations, the communications manager 720 may be configured as or otherwise support a means for deactivating the timer for falling back to the default BWP in accordance with the switching and prior to the expiration of the timer for falling back to the default BWP.

In some implementations, the timer for falling back to the default BWP corresponds to the energy level of the UE failing to satisfy the threshold energy level, and the communications manager 720 may be configured as or otherwise support a means for initializing a second timer corresponding to the energy level of the UE satisfying the threshold energy level, where a duration of the second timer is shorter than a duration of the timer configured for falling back to the default BWP, and where the active BWP is switched from the first BWP to the default BWP in accordance with an expiration of the second timer.

In some implementations, the communications manager 720 may be configured as or otherwise support a means for storing a set of multiple durations corresponding to a set of multiple timers including at least the timer and the second timer, where each timer of the set of multiple timers corresponds to a respective energy state of the UE.

In some implementations, the communications manager 720 may be configured as or otherwise support a means for receiving control signaling configuring the UE to support switching the active BWP from the first BWP to the default BWP prior to the expiration of the timer for falling back to the default BWP.

In some implementations, the communications manager 720 may be configured as or otherwise support a means for transmitting an indication of the switching the active BWP from the first BWP to the default BWP. In some implementations, the indication includes a request to switch the active BWP from the first BWP to the default BWP, and the communications manager 720 may be configured as or otherwise support a means for receiving, in response to the request, a confirmation to switch the active BWP from the first BWP to the default BWP, where the active BWP is switched from the first BWP to the default BWP in accordance with the received confirmation. In some implementations, the indication of the switching the active BWP from the first BWP to the default BWP includes an indication of when the switching occurred.

In some implementations, the switching the active BWP is further in accordance with a charging rate of the UE satisfying a threshold charging rate. In some implementations, the switching the active BWP is further in accordance with a remaining active time for the timer for falling back to the default BWP satisfying a threshold remaining active time.

In some implementations, the communications manager 720 may be configured as or otherwise support a means for monitoring a current energy level of the UE, where the energy level of the UE satisfying the threshold energy level includes the current energy level of the UE being below the threshold energy level. In some such implementations, the communications manager 720 may be configured as or otherwise support a means for triggering the switching the active BWP in accordance with the current energy level of the UE being below the threshold energy level.

In some implementations, the default BWP spans fewer frequency resources than the first BWP.

In some implementations, the communications manager 720 may be configured to perform various operations (such as receiving, monitoring, transmitting, or other operations) using or otherwise in cooperation with the transceiver 715, the one or more antennas 725, or any combination thereof. Although the communications manager 720 is illustrated as a separate component, in some implementations, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of BWP dynamic adaptation in accordance with an energy level at a UE as described herein, or the processor 740 and the memory 730 may be otherwise configured to perform or support such operations.

In some implementations, the processor 740 may be a component of a processing system. A processing system may generally refer to a system or series of machines or components that receives inputs and processes the inputs to produce a set of outputs (which may be passed to other systems or components of, for example, the device 705, such as a UE 115, a network entity 105, a BS, an access point, a station, or different device). For example, a processing system of the device 705 may refer to a system including the various other components or subcomponents of the device 705.

The processing system of the device 705 may interface with other components of the device 705 and may process information received from other components (such as inputs or signals), output information to other components, or both. For example, a chip or modem of the device 705 may include a processing system and an interface. The interface may obtain information from other components or devices external to the chip or modem, output information to other components or devices external to the chip or modem, or both. In some implementations, the interface may refer to both a first interface and a second interface. For example, the first interface, or a first aspect of the interface, may refer to an interface between the processing system of the chip or modem and a receiver, such that the device 705 may receive information or signal inputs, and the information may be passed to the processing system. The second interface, or a second aspect of the interface, may refer to an interface between the processing system of the chip or modem and a transmitter, such that the device 705 may transmit information output from the chip or modem.

Figure 8:
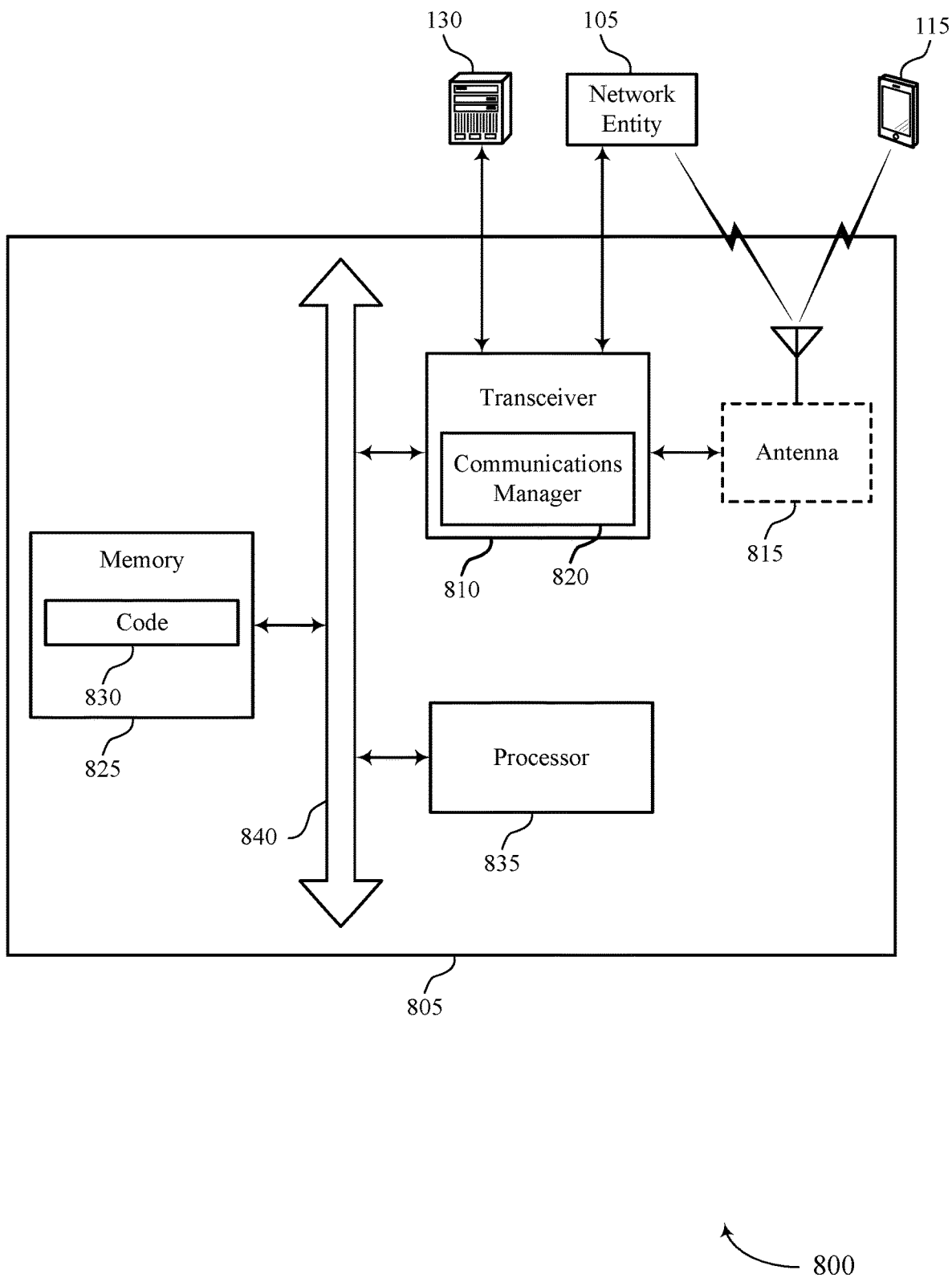

FIG. 8 shows a block diagram 800 of an example device 805 that supports BWP dynamic adaptation in accordance with an energy level at a UE. The device 805 may communicate with one or more network entities 105 (such as one or more components of one or more BSs), one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (such as coupled operatively, communicatively, functionally, electronically, or electrically) via one or more buses, such as a bus 840.

The transceiver 810 may support bi-directional communications via wired links, wireless links, or both as described herein. In some implementations, the transceiver 810 may include a wired transceiver and may communicate bi-directionally with another wired transceiver. Additionally, or alternatively, in some implementations, the transceiver 810 may include a wireless transceiver and may communicate bi-directionally with another wireless transceiver. In some implementations, the device 805 may include one or more antennas 815, which may be capable of transmitting or receiving wireless transmissions. The transceiver 810 also may include a modem to modulate signals, to provide the modulated signals for transmission (such as by one or more antennas 815 or by a wired transmitter), to receive modulated signals (such as from one or more antennas 815 or from a wired receiver), and to demodulate signals. In some implementations, the transceiver may be operable to support communications via one or more communications links (such as a communication link 125, a backhaul communication link 120, a midhaul communication link 162, or a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some implementations, the code 830 may not be directly executable by the processor 835 but may cause a computer, when compiled and executed, to perform functions described herein. In some implementations, the memory 825 may include, among other things, a BIOS which may control basic hardware or software operation such as the interaction with peripheral components or devices.

The processor 835 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 835 may be configured to operate a memory array using a memory controller. In some other implementations, a memory controller may be integrated into the processor 835. The processor 835 may be configured to execute computer-readable instructions stored in a memory (such as the memory 825) to cause the device 805 to perform various functions (such as functions or tasks supporting BWP dynamic adaptation in accordance with an energy level at a UE 115). For example, the device 805 or a component of the device 805 may include a processor 835 and memory 825 coupled with the processor 835, the processor 835 and memory 825 configured to perform various functions described herein. The processor 835 may be an example of a cloud-computing platform (such as one or more physical nodes and supporting software such as operating systems, virtual machines, or container instances) that may host the functions, by executing the code 830, to perform the functions of the device 805.

In some implementations, a bus 840 may support communications of a protocol layer of a protocol stack. In some implementations, a bus 840 may support communications associated with a logical channel of a protocol stack (such as between protocol layers of a protocol stack), which may include communications performed within a component of the device 805 or between different components of the device 805 that may be co-located or located in different locations. The device 805 may refer to a system in which one or more of the communications manager 820, the transceiver 810, the memory 825, the code 830, and the processor 835 may be located in one of the different components or divided between different components.

In some implementations, the communications manager 820 may manage aspects of communications with a core network 130 (such as via one or more wired or wireless backhaul links). For example, the communications manager 820 may manage the transfer of data communications for client devices, such as one or more UEs 115. In some implementations, the communications manager 820 may manage communications with other network entities 105, and may include a controller or scheduler for controlling communications with UEs 115 in cooperation with other network entities 105. In some implementations, the communications manager 820 may support an X2 interface within an LTE/LTE-A wireless communications network technology to provide communication between network entities 105.

The communications manager 820 may support wireless communications in accordance with examples as disclosed herein. For example, the communications manager 820 may be configured as or otherwise support a means for receiving an indication that a UE is to select a bandwidth size of an active BWP in accordance with an energy level of the UE satisfying a threshold energy level. The communications manager 820 may be configured as or otherwise support a means for selecting the bandwidth size of the active BWP for communications with the UE in accordance with the received indication.

In some implementations, the communications manager 820 may be configured as or otherwise support a means for communicating using the selected bandwidth size of the active BWP.

In some implementations, the indication that the UE is to select the bandwidth size of the active BWP includes a request to reduce the bandwidth size of the active BWP, and the communications manager 820 may be configured as or otherwise support a means for transmitting, in response to the request, a confirmation for the UE to reduce the bandwidth size of the active BWP, where the selecting the bandwidth size of the active BWP is in accordance with the confirmation.

In some implementations, the communications manager 820 may be configured as or otherwise support a means for transmitting control signaling configuring the UE to support selecting the bandwidth size of the active BWP in accordance with the energy level of the UE satisfying the threshold energy level, where the indication that the UE is to select the bandwidth size of the active BWP is received according to the control signaling. In some implementations, the control signaling indicates a set of multiple configurations for reducing BWPs, a configuration of the set of multiple configurations corresponding to a respective BWP of a set of multiple BWPs configured for the UE. In some implementations, the control signaling includes RRC signaling, a MAC CE, DCI, SCI, or any combination thereof.

In some implementations, the selected bandwidth size corresponds to a set of frequency resources, and the communications manager 820 may be configured as or otherwise support a means for assigning PDCCH signaling, PDSCH signaling, PSCCH signaling, PSSCH signaling, or any combination thereof to one or more frequency resources within the set of frequency resources.

In some implementations, the indication that the UE is to select the bandwidth size of the active BWP is received in UE assistance information, RRC signaling, a MAC-CE, UCI, SCI, PSFCH signaling, or any combination thereof.

In some implementations, the indication that the UE is to select the bandwidth size of the active BWP includes a bit indicating that the UE selected the bandwidth size of the active BWP, a bit map indicating a configuration selected for the bandwidth size of the active BWP from a set of multiple configurations, a bit map indicating a set of resources corresponding to the selected bandwidth size of the active BWP, or any combination thereof.

In some implementations, the active BWP is configured for uplink reception, downlink transmission, sidelink reception, sidelink transmission, or any combination thereof.

Additionally, or alternatively, the communications manager 820 may support wireless communications in accordance with examples as disclosed herein. For example, the communications manager 820 may be configured as or otherwise support a means for receiving an indication that a UE is to switch an active BWP from a first BWP to a default BWP prior to an expiration of a timer configured for the UE to fall back to the default BWP, the switching the active BWP being in accordance with an energy level of the UE satisfying a threshold energy level. The communications manager 820 may be configured as or otherwise support a means for switching the active BWP for communications with the UE from the first BWP to the default BWP in accordance with the received indication. The communications manager 820 may be configured as or otherwise support a means for communicating using the default BWP as the active BWP.

In some implementations, the indication includes a request to switch the active BWP from the first BWP to the default BWP, and the communications manager 820 may be configured as or otherwise support a means for transmitting, in response to the request, a confirmation for the UE to switch the active BWP from the first BWP to the default BWP, where the communicating using the default BWP as the active BWP is in accordance with the confirmation.

In some implementations, the communications manager 820 may be configured as or otherwise support a means for transmitting control signaling configuring the UE to support switching the active BWP from the first BWP to the default BWP prior to the expiration of the timer configured for the UE to fall back to the default BWP.

In some implementations, the indication that the UE is to switch the active BWP from the first BWP to the default BWP includes an indication of when the switching occurred at the UE, and the communications manager 820 may be configured as or otherwise support a means for retransmitting a message in response to the indication of when the switching occurred at the UE.

In some implementations, the default BWP spans fewer frequency resources than the first BWP.

In some implementations, the communications manager 820 may be configured to perform various operations (such as receiving, obtaining, monitoring, outputting, transmitting, or other operations) using or otherwise in cooperation with the transceiver 810, the one or more antennas 815, or any combination thereof. Although the communications manager 820 is illustrated as a separate component, in some implementations, one or more functions described with reference to the communications manager 820 may be supported by or performed by the processor 835, the memory 825, the code 830, or any combination thereof. For example, the code 830 may include instructions executable by the processor 835 to cause the device 805 to perform various aspects of BWP dynamic adaptation in accordance with an energy level at a UE as described herein, or the processor 835 and the memory 825 may be otherwise configured to perform or support such operations.

In some implementations, the processor 835 may be a component of a processing system. A processing system may generally refer to a system or series of machines or components that receives inputs and processes the inputs to produce a set of outputs (which may be passed to other systems or components of, for example, the device 805, such as a UE 115, a network entity 105, a BS, an access point, a station, or different device). For example, a processing system of the device 805 may refer to a system including the various other components or subcomponents of the device 805.

The processing system of the device 805 may interface with other components of the device 805 and may process information received from other components (such as inputs or signals), output information to other components, or both. For example, a chip or modem of the device 805 may include a processing system and an interface. The interface may obtain information from other components or devices external to the chip or modem, output information to other components or devices external to the chip or modem, or both. In some implementations, the interface may refer to both a first interface and a second interface. For example, the first interface, or a first aspect of the interface, may refer to an interface between the processing system of the chip or modem and a receiver, such that the device 805 may receive information or signal inputs, and the information may be passed to the processing system. The second interface, or a second aspect of the interface, may refer to an interface between the processing system of the chip or modem and a transmitter, such that the device 805 may transmit information output from the chip or modem.

Figure 9:
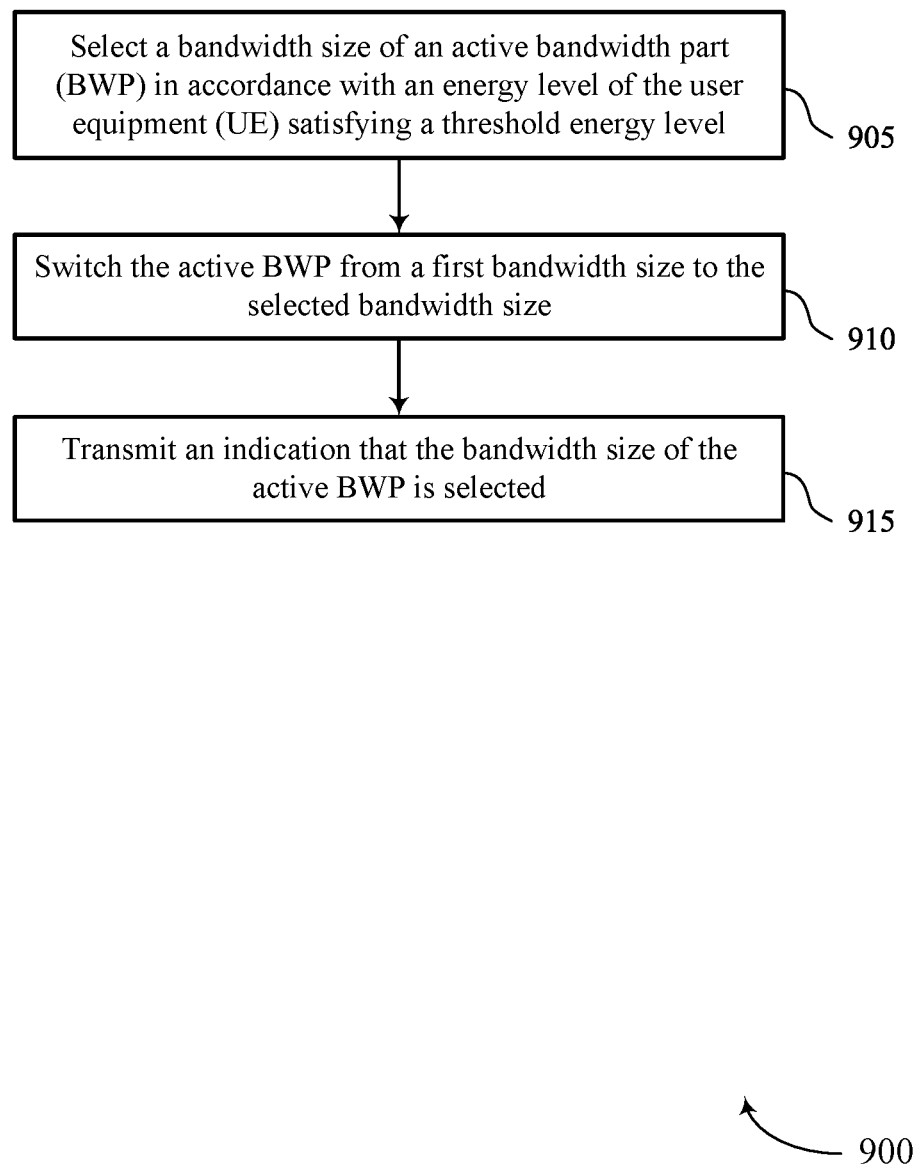
FIGS. 9-12 show flowcharts illustrating example methods that support BWP dynamic adaptation in accordance with an energy level at a UE.

FIG. 9 shows a flowchart illustrating an example method 900 that supports BWP dynamic adaptation in accordance with an energy level at a UE. The operations of the method 900 may be implemented by a UE or its components as described herein. For example, the operations of the method 900 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 905, the method may include selecting a bandwidth size of an active BWP in accordance with an energy level of the UE satisfying a threshold energy level. The operations of 905 may be performed in accordance with examples as disclosed herein.

At 910, the method may include switching the active BWP from a first bandwidth size to the selected bandwidth size. The operations of 910 may be performed in accordance with examples as disclosed herein.

At 915, the method may include transmitting an indication that the bandwidth size of the active BWP is selected. The operations of 915 may be performed in accordance with examples as disclosed herein.

Figure 10:
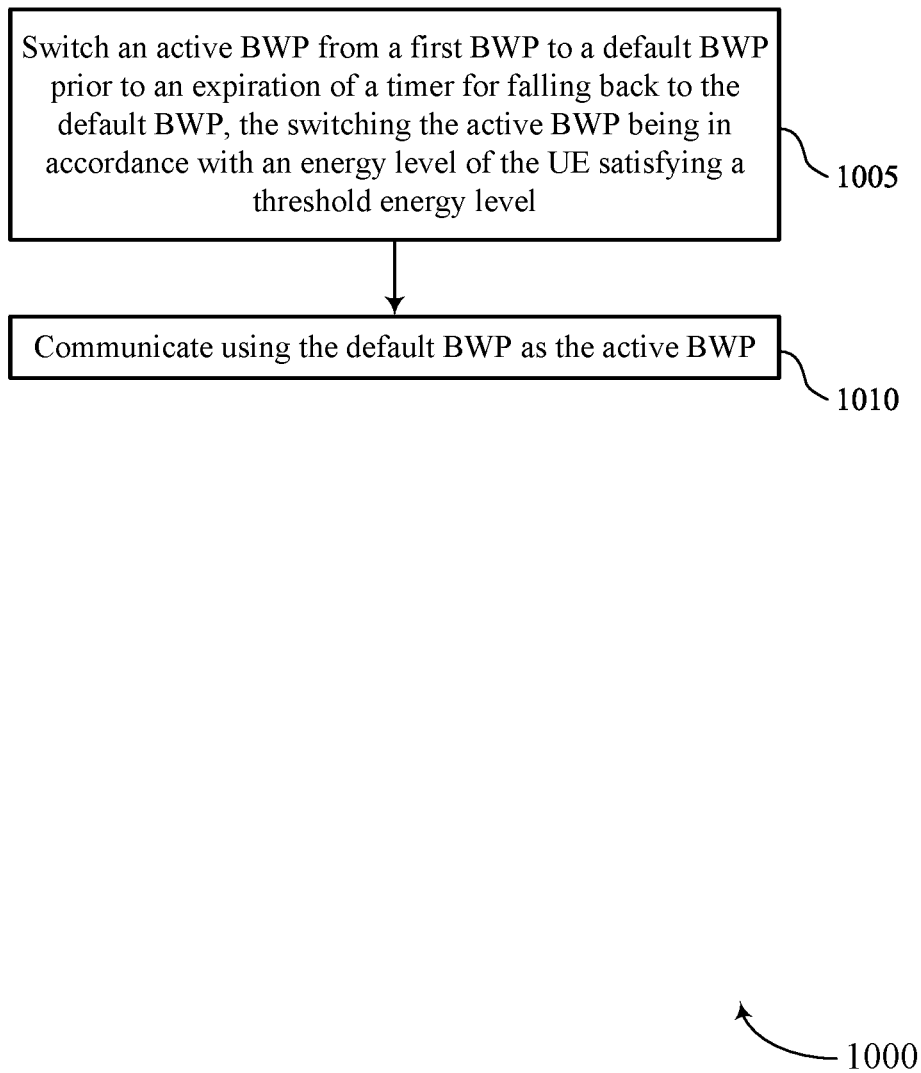

FIG. 10 shows a flowchart illustrating an example method 1000 that supports BWP dynamic adaptation in accordance with an energy level at a UE. The operations of the method 1000 may be implemented by a UE or its components as described herein. For example, the operations of the method 1000 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 1005, the method may include switching an active BWP from a first BWP to a default BWP prior to an expiration of a timer for falling back to the default BWP. The switching the active BWP may be in accordance with an energy level of the UE satisfying a threshold energy level. The operations of 1005 may be performed in accordance with examples as disclosed herein.

At 1010, the method may include communicating using the default BWP as the active BWP. The operations of 1010 may be performed in accordance with examples as disclosed herein.

Figure 11:
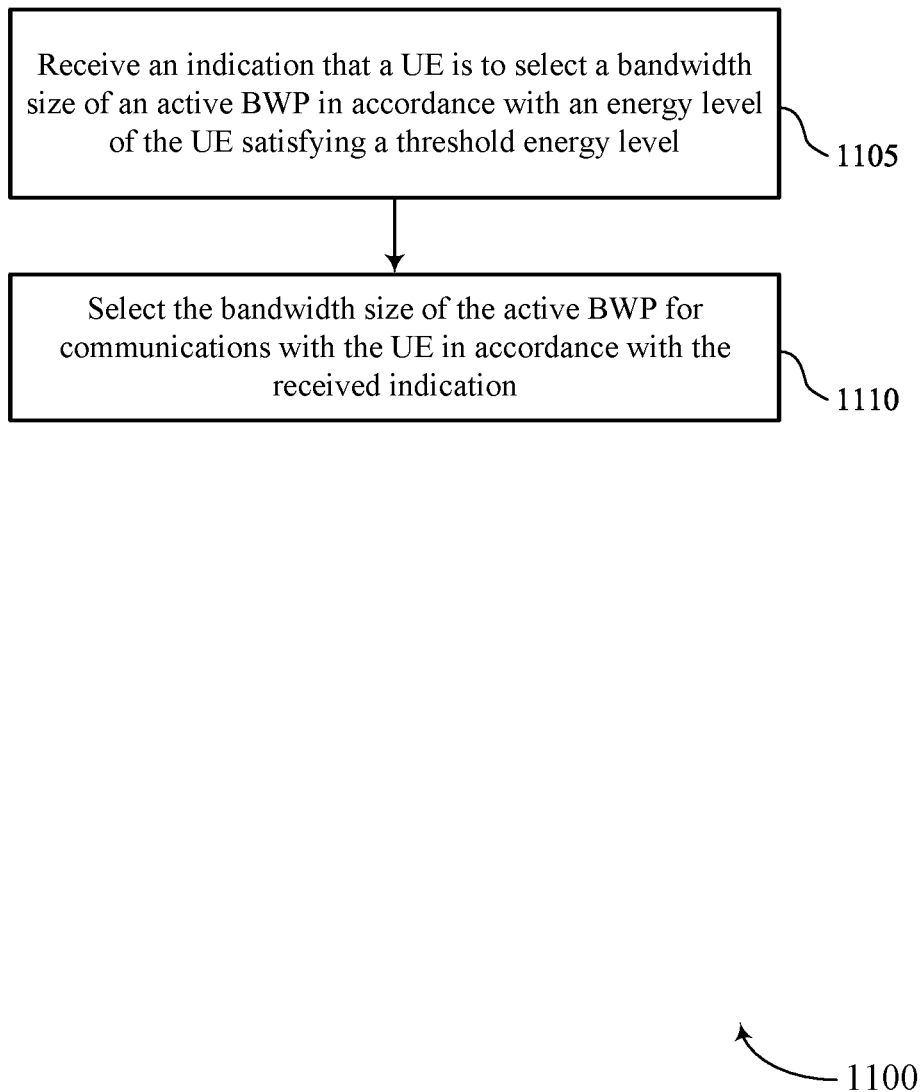

FIG. 11 shows a flowchart illustrating an example method 1100 that supports BWP dynamic adaptation in accordance with an energy level at a UE. The operations of the method 1100 may be implemented by a UE, a network entity, or components of a UE or network entity as described herein. For example, the operations of the method 1100 may be performed by a UE or network entity as described with reference to FIGS. 1-8. In some implementations, a UE or network entity may execute a set of instructions to control the functional elements of the UE or network entity to perform the described functions. Additionally, or alternatively, the UE or network entity may perform aspects of the described functions using special-purpose hardware.

At 1105, the method may include receiving an indication that a UE is to select a bandwidth size of an active BWP in accordance with an energy level of the UE satisfying a threshold energy level. The operations of 1105 may be performed in accordance with examples as disclosed herein.

At 1110, the method may include selecting the bandwidth size of the active BWP for communications with the UE in accordance with the received indication. The operations of 1110 may be performed in accordance with examples as disclosed herein.

Figure 12:
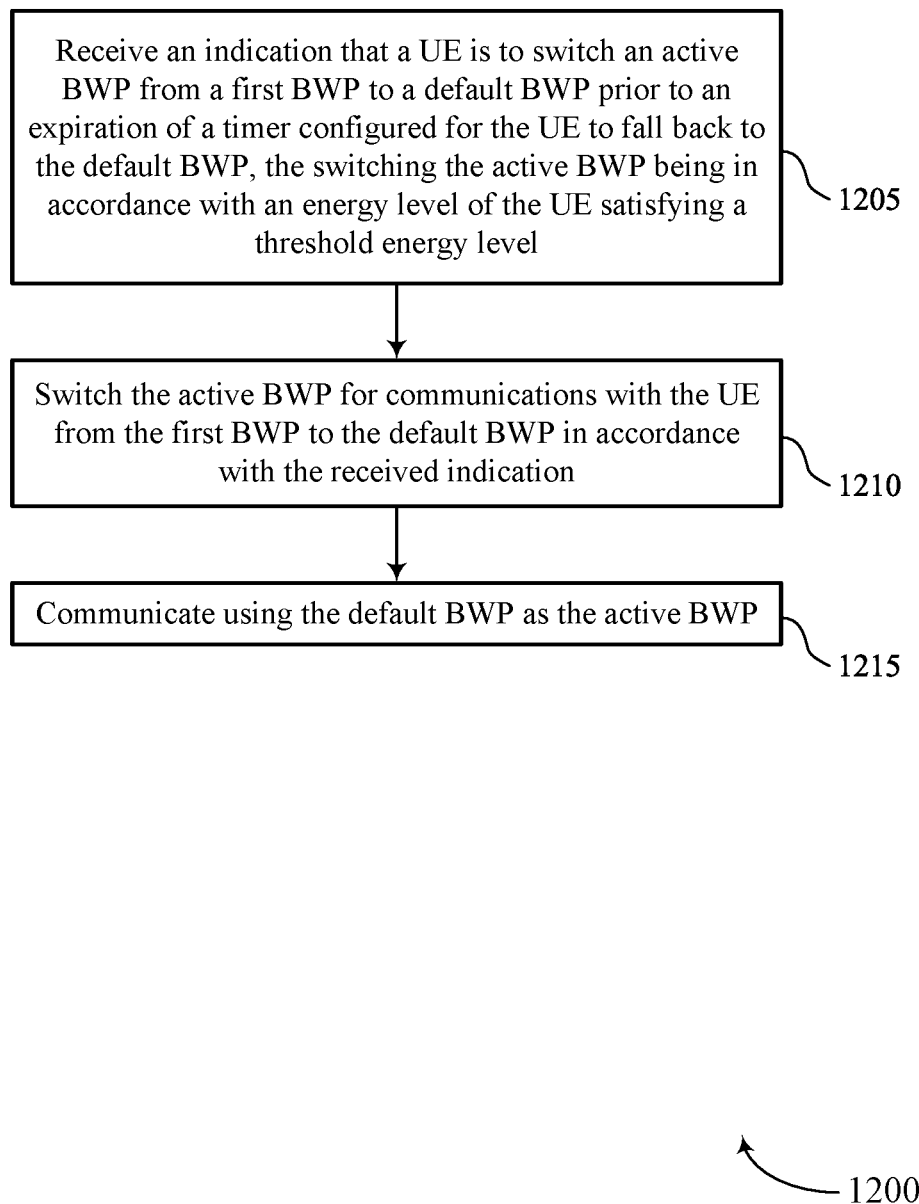

FIG. 12 shows a flowchart illustrating an example method 1200 that supports BWP dynamic adaptation in accordance with an energy level at a UE. The operations of the method 1200 may be implemented by a UE, a network entity, or components of a UE or network entity as described herein. For example, the operations of the method 1200 may be performed by a UE or network entity as described with reference to FIGS. 1-8. In some implementations, a UE or network entity may execute a set of instructions to control the functional elements of the UE or network entity to perform the described functions. Additionally, or alternatively, the UE or network entity may perform aspects of the described functions using special-purpose hardware.

At 1205, the method may include receiving an indication that a UE is to switch an active BWP from a first BWP to a default BWP prior to an expiration of a timer configured for the UE to fall back to the default BWP. The switching the active BWP may be in accordance with an energy level of the UE satisfying a threshold energy level. The operations of 1205 may be performed in accordance with examples as disclosed herein.

At 1210, the method may include switching the active BWP for communications with the UE from the first BWP to the default BWP in accordance with the received indication. The operations of 1210 may be performed in accordance with examples as disclosed herein.

At 1215, the method may include communicating using the default BWP as the active BWP. The operations of 1215 may be performed in accordance with examples as disclosed herein.

The following provides an overview of some aspects of the present disclosure:

Aspect 1: An apparatus for wireless communications, including: a processing system configured to: select a bandwidth size of an active BWP in accordance with an energy level of a UE satisfying a threshold energy level; and switch the active BWP from a first bandwidth size to the selected bandwidth size; and an interface configured to: output an indication that the bandwidth size of the active BWP is selected.

Aspect 2: The apparatus of aspect 1, where the interface is further configured to: output or obtain signaling using the selected bandwidth size of the active BWP in accordance with the indication and the switching.

Aspect 3: The apparatus of any of aspects 1 through 2, where the indication that the bandwidth size of the active BWP is selected includes a request to reduce the bandwidth size of the active BWP, and the interface is further configured to: obtain, in response to the request, a confirmation to reduce the bandwidth size of the active BWP, where the active BWP is switched from the first bandwidth size to the selected bandwidth size in accordance with the obtained confirmation.

Aspect 4: The apparatus of aspect 3, where the request indicates the energy level of the UE.

Aspect 5: The apparatus of any of aspects 1 through 4, where the interface is further configured to: obtain control signaling configuring the UE to support selecting the bandwidth size of the active BWP in accordance with the energy level of the UE satisfying the threshold energy level, where the bandwidth size of the active BWP is selected according to the control signaling.

Aspect 6: The apparatus of aspect 5, where the control signaling indicates a set of multiple configurations for reducing BWPs, a configuration of the set of multiple configurations corresponding to a respective BWP of a set of multiple BWPs configured for the UE.

Aspect 7: The apparatus of any of aspects 5 through 6, where the control signaling includes RRC signaling, a MAC-CE, DCI, SCI, or any combination thereof.

Aspect 8: The apparatus of any of aspects 1 through 7, where the processing system configured to switch the active BWP from the first bandwidth size to the selected bandwidth size is configured to: modify the bandwidth size of the active BWP from a first set of frequency resources to a second set of frequency resources, the second set of frequency resources including fewer frequency resources than the first set of frequency resources, and the second set of frequency resources supporting obtaining control signaling configured for the active BWP.

Aspect 9: The apparatus of aspect 8, where the second set of frequency resources includes searching occasions for SSBs, SI, paging signals, or any combination thereof.

Aspect 10: The apparatus of any of aspects 1 through 9, where: the interface is further configured to: obtain information indicating a current energy level of the UE, where the energy level of the UE satisfying the threshold energy level includes the current energy level of the UE being below the threshold energy level; and the processing system is further configured to: trigger the selecting the bandwidth size of the active BWP in accordance with the current energy level of the UE being below the threshold energy level.

Aspect 11: The apparatus of any of aspects 1 through 10, where the indication that the bandwidth size of the active BWP is selected is output in UE assistance information, RRC signaling, a MAC-CE, UCI, SCI, PSFCH signaling, or any combination thereof.

Aspect 12: The apparatus of any of aspects 1 through 11, where the indication that the bandwidth size of the active BWP is selected includes a bit indicating that the bandwidth size of the active BWP is selected, a bit map indicating a configuration selected for the bandwidth size of the active BWP from a set of multiple configurations, a bit map indicating a set of resources corresponding to the selected bandwidth size of the active BWP, or any combination thereof.

Aspect 13: The apparatus of any of aspects 1 through 12, where the bandwidth size of the active BWP is selected for a resource pool of a set of multiple resource pools for sidelink communications.

Aspect 14: The apparatus of any of aspects 1 through 13, where the active BWP is configured for uplink transmission, downlink reception, sidelink transmission, sidelink reception, or any combination thereof.

Aspect 15: An apparatus for wireless communications, including: a processing system configured to: switch an active BWP from a first BWP to a default BWP prior to an expiration of a timer for falling back to the default BWP, the switching the active BWP being in accordance with an energy level of a UE satisfying a threshold energy level; and an interface configured to: output or obtain signaling using the default BWP as the active BWP.

Aspect 16: The apparatus of aspect 15, where the processing system is further configured to: initialize the timer for falling back to the default BWP in response to inactivity on the active BWP by the UE; and deactivate the timer for falling back to the default BWP in accordance with the switching and prior to the expiration of the timer for falling back to the default BWP.

Aspect 17: The apparatus of aspect 15, where the timer for falling back to the default BWP corresponds to the energy level of the UE failing to satisfy the threshold energy level, and the processing system is further configured to: initialize a second timer corresponding to the energy level of the UE satisfying the threshold energy level, where a duration of the second timer is shorter than a duration of the timer configured for falling back to the default BWP, and where the active BWP is switched from the first BWP to the default BWP in accordance with an expiration of the second timer.

Aspect 18: The apparatus of aspect 17, where the processing system is further configured to: store a set of multiple durations corresponding to a set of multiple timers including at least the timer and the second timer, where each timer of the set of multiple timers corresponds to a respective energy state of the UE.

Aspect 19: The apparatus of any of aspects 15 through 18, where the interface is further configured to: obtain control signaling configuring the UE to support switching the active BWP from the first BWP to the default BWP prior to the expiration of the timer for falling back to the default BWP.

Aspect 20: The apparatus of any of aspects 15 through 19, where the interface is further configured to: output an indication of the switching the active BWP from the first BWP to the default BWP.

Aspect 21: The apparatus of aspect 20, where the indication includes a request to switch the active BWP from the first BWP to the default BWP, and the interface is further configured to: obtain, in response to the request, a confirmation to switch the active BWP from the first BWP to the default BWP, where the active BWP is switched from the first BWP to the default BWP in accordance with the obtained confirmation.

Aspect 22: The apparatus of any of aspects 20 through 21, where the indication of the switching the active BWP from the first BWP to the default BWP includes an indication of when the switching occurred.

Aspect 23: The apparatus of any of aspects 15 through 22, where the switching the active BWP is further in accordance with a charging rate of the UE satisfying a threshold charging rate.

Aspect 24: The apparatus of any of aspects 15 through 23, where the switching the active BWP is further in accordance with a remaining active time for the timer for falling back to the default BWP satisfying a threshold remaining active time.

Aspect 25: The apparatus of any of aspects 15 through 24, where: the interface is further configured to: obtain information indicating a current energy level of the UE, where the energy level of the UE satisfying the threshold energy level includes the current energy level of the UE being below the threshold energy level; and the processing system is further configured to: trigger the switching the active BWP in accordance with the current energy level of the UE being below the threshold energy level.

Aspect 26: The apparatus of any of aspects 15 through 25, where the default BWP spans fewer frequency resources than the first BWP.

Aspect 27: An apparatus for wireless communications, including: an interface configured to: obtain an indication that a UE is to select a bandwidth size of an active BWP in accordance with an energy level of the UE satisfying a threshold energy level; and a processing system configured to: select the bandwidth size of the active BWP for communications with the UE in accordance with the obtained indication.

Aspect 28: The apparatus of aspect 27, where the interface is further configured to: output or obtain signaling using the selected bandwidth size of the active BWP.

Aspect 29: The apparatus of any of aspects 27 through 28, where the indication that the UE is to select the bandwidth size of the active BWP includes a request to reduce the bandwidth size of the active BWP, and the interface is further configured to: output, in response to the request, a confirmation for the UE to reduce the bandwidth size of the active BWP, where the selecting the bandwidth size of the active BWP is in accordance with the confirmation.

Aspect 30: The apparatus of any of aspects 27 through 29, where the interface is further configured to: output control signaling configuring the UE to support selecting the bandwidth size of the active BWP in accordance with the energy level of the UE satisfying the threshold energy level, where the indication that the UE is to select the bandwidth size of the active BWP is obtained according to the control signaling.

Aspect 31: The apparatus of aspect 30, where the control signaling indicates a set of multiple configurations for reducing BWPs, a configuration of the set of multiple configurations corresponding to a respective BWP of a set of multiple BWPs configured for the UE.

Aspect 32: The apparatus of any of aspects 30 through 31, where the control signaling includes RRC signaling, a MAC-CE, DCI, SCI, or any combination thereof.

Aspect 33: The apparatus of any of aspects 27 through 32, where the selected bandwidth size corresponds to a set of frequency resources, and the processing system is further configured to: assign PDCCH signaling, PDSCH signaling, PSCCH signaling, PSSCH signaling, or any combination thereof to one or more frequency resources within the set of frequency resources.

Aspect 34: The apparatus of any of aspects 27 through 33, where the indication that the UE is to select the bandwidth size of the active BWP is obtained in UE assistance information, RRC signaling, a MAC-CE, UCI, SCI, PSFCH signaling, or any combination thereof.

Aspect 35: The apparatus of any of aspects 27 through 34, where the indication that the UE is to select the bandwidth size of the active BWP includes a bit indicating that the UE selected the bandwidth size of the active BWP, a bit map indicating a configuration selected for the bandwidth size of the active BWP from a set of multiple configurations, a bit map indicating a set of resources corresponding to the selected bandwidth size of the active BWP, or any combination thereof.

Aspect 36: The apparatus of any of aspects 27 through 35, where the active BWP is configured for uplink reception, downlink transmission, sidelink reception, sidelink transmission, or any combination thereof.

Aspect 37: An apparatus for wireless communications, including: an interface configured to: obtain an indication that a UE is to switch an active BWP from a first BWP to a default BWP prior to an expiration of a timer configured for the UE to fall back to the default BWP, the switching the active BWP being in accordance with an energy level of the UE satisfying a threshold energy level; a processing system configured to: switch the active BWP for communications with the UE from the first BWP to the default BWP in accordance with the obtained indication; and the interface further configured to: output or obtain signaling using the default BWP as the active BWP.

Aspect 38: The apparatus of aspect 37, where the indication includes a request to switch the active BWP from the first BWP to the default BWP, and the interface is further configured to: output, in response to the request, a confirmation for the UE to switch the active BWP from the first BWP to the default BWP, where the outputting or obtaining signaling using the default BWP as the active BWP is in accordance with the confirmation.

Aspect 39: The apparatus of any of aspects 37 through 38, where the interface is further configured to: output control signaling configuring the UE to support switching the active BWP from the first BWP to the default BWP prior to the expiration of the timer configured for the UE to fall back to the default BWP.

Aspect 40: The apparatus of any of aspects 37 through 39, where the indication that the UE is to switch the active BWP from the first BWP to the default BWP includes an indication of when the switching occurred at the UE, and the interface is further configured to: output a retransmission of a message in response to the indication of when the switching occurred at the UE.

Aspect 41: The apparatus of any of aspects 37 through 40, where the default BWP spans fewer frequency resources than the first BWP.

Aspect 42: A method for wireless communications at a UE, including: selecting a bandwidth size of an active BWP in accordance with an energy level of the UE satisfying a threshold energy level; switching the active BWP from a first bandwidth size to the selected bandwidth size; and transmitting an indication that the bandwidth size of the active BWP is selected.

Aspect 43: The method of aspect 42, further including: communicating using the selected bandwidth size of the active BWP in accordance with the indication and the switching.

Aspect 44: The method of any of aspects 42 through 43, where the indication that the bandwidth size of the active BWP is selected includes a request to reduce the bandwidth size of the active BWP, the method further including: receiving, in response to the request, a confirmation to reduce the bandwidth size of the active BWP, where the active BWP is switched from the first bandwidth size to the selected bandwidth size in accordance with the received confirmation.

Aspect 45: The method of aspect 44, where the request indicates the energy level of the UE.

Aspect 46: The method of any of aspects 42 through 45, further including: receiving control signaling configuring the UE to support selecting the bandwidth size of the active BWP in accordance with the energy level of the UE satisfying the threshold energy level, where the bandwidth size of the active BWP is selected according to the control signaling.

Aspect 47: The method of aspect 46, where the control signaling indicates a set of multiple configurations for reducing BWPs, a configuration of the set of multiple configurations corresponding to a respective BWP of a set of multiple BWPs configured for the UE.

Aspect 48: The method of any of aspects 46 through 47, where the control signaling includes RRC signaling, a MAC-CE, DCI, SCI, or any combination thereof.

Aspect 49: The method of any of aspects 42 through 48, where switching the active BWP from the first bandwidth size to the selected bandwidth size includes: modifying the bandwidth size of the active BWP from a first set of frequency resources to a second set of frequency resources, the second set of frequency resources including fewer frequency resources than the first set of frequency resources, and the second set of frequency resources supporting reception of control signaling configured for the active BWP.

Aspect 50: The method of aspect 49, where the second set of frequency resources includes searching occasions for SSBs, SI, paging signals, or any combination thereof.

Aspect 51: The method of any of aspects 42 through 50, further including: monitoring a current energy level of the UE, where the energy level of the UE satisfying the threshold energy level includes the current energy level of the UE being below the threshold energy level; and triggering the selecting the bandwidth size of the active BWP in accordance with the current energy level of the UE being below the threshold energy level.

Aspect 52: The method of any of aspects 42 through 51, where the indication that the bandwidth size of the active BWP is selected is transmitted in UE assistance information, RRC signaling, a MAC-CE, UCI, SCI, PSFCH signaling, or any combination thereof.

Aspect 53: The method of any of aspects 42 through 52, where the indication that the bandwidth size of the active BWP is selected includes a bit indicating that the bandwidth size of the active BWP is selected, a bit map indicating a configuration selected for the bandwidth size of the active BWP from a set of multiple configurations, a bit map indicating a set of resources corresponding to the selected bandwidth size of the active BWP, or any combination thereof.

Aspect 54: The method of any of aspects 42 through 53, where the bandwidth size of the active BWP is selected for a resource pool of a set of multiple resource pools for sidelink communications.

Aspect 55: The method of any of aspects 42 through 54, where the active BWP is configured for uplink transmission, downlink reception, sidelink transmission, sidelink reception, or any combination thereof.

Aspect 56: A method for wireless communications at a UE, including: switching an active BWP from a first BWP to a default BWP prior to an expiration of a timer for falling back to the default BWP, the switching the active BWP being in accordance with an energy level of the UE satisfying a threshold energy level; and communicating using the default BWP as the active BWP.

Aspect 57: The method of aspect 56, further including: initializing the timer for falling back to the default BWP in response to inactivity on the active BWP by the UE; and deactivating the timer for falling back to the default BWP in accordance with the switching and prior to the expiration of the timer for falling back to the default BWP.

Aspect 58: The method of aspect 56, where the timer for falling back to the default BWP corresponds to the energy level of the UE failing to satisfy the threshold energy level, the method further including: initializing a second timer corresponding to the energy level of the UE satisfying the threshold energy level, where a duration of the second timer is shorter than a duration of the timer configured for falling back to the default BWP, and where the active BWP is switched from the first BWP to the default BWP in accordance with an expiration of the second timer.

Aspect 59: The method of aspect 58, further including: storing a set of multiple durations corresponding to a set of multiple timers including at least the timer and the second timer, where each timer of the set of multiple timers corresponds to a respective energy state of the UE.

Aspect 60: The method of any of aspects 56 through 59, further including: receiving control signaling configuring the UE to support switching the active BWP from the first BWP to the default BWP prior to the expiration of the timer for falling back to the default BWP.

Aspect 61: The method of any of aspects 56 through 60, further including: transmitting an indication of the switching the active BWP from the first BWP to the default BWP.

Aspect 62: The method of aspect 61, where the indication includes a request to switch the active BWP from the first BWP to the default BWP, the method further including: receiving, in response to the request, a confirmation to switch the active BWP from the first BWP to the default BWP, where the active BWP is switched from the first BWP to the default BWP in accordance with the received confirmation.

Aspect 63: The method of any of aspects 61 through 62, where the indication of the switching the active BWP from the first BWP to the default BWP includes an indication of when the switching occurred.

Aspect 64: The method of any of aspects 56 through 63, where the switching the active BWP is further in accordance with a charging rate of the UE satisfying a threshold charging rate.

Aspect 65: The method of any of aspects 56 through 64, where the switching the active BWP is further in accordance with a remaining active time for the timer for falling back to the default BWP satisfying a threshold remaining active time.

Aspect 66: The method of any of aspects 56 through 65, further including: monitoring a current energy level of the UE, where the energy level of the UE satisfying the threshold energy level includes the current energy level of the UE being below the threshold energy level; and triggering the switching the active BWP in accordance with the current energy level of the UE being below the threshold energy level.

Aspect 67: The method of any of aspects 56 through 66, where the default BWP spans fewer frequency resources than the first BWP.

Aspect 68: A method for wireless communications, including: receiving an indication that a UE is to select a bandwidth size of an active BWP in accordance with an energy level of the UE satisfying a threshold energy level; and selecting the bandwidth size of the active BWP for communications with the UE in accordance with the received indication.

Aspect 69: The method of aspect 68, further including: communicating using the selected bandwidth size of the active BWP.

Aspect 70: The method of any of aspects 68 through 69, where the indication that the UE is to select the bandwidth size of the active BWP includes a request to reduce the bandwidth size of the active BWP, the method further including: transmitting, in response to the request, a confirmation for the UE to reduce the bandwidth size of the active BWP, where the selecting the bandwidth size of the active BWP is in accordance with the confirmation.

Aspect 71: The method of any of aspects 68 through 70, further including: transmitting control signaling configuring the UE to support selecting the bandwidth size of the active BWP in accordance with the energy level of the UE satisfying the threshold energy level, where the indication that the UE is to select the bandwidth size of the active BWP is received according to the control signaling.

Aspect 72: The method of aspect 71, where the control signaling indicates a set of multiple configurations for reducing BWPs, a configuration of the set of multiple configurations corresponding to a respective BWP of a set of multiple BWPs configured for the UE.

Aspect 73: The method of any of aspects 71 through 72, where the control signaling includes RRC signaling, a MAC-CE, DCI, SCI, or any combination thereof.

Aspect 74: The method of any of aspects 68 through 73, where the selected bandwidth size corresponds to a set of frequency resources, the method further including: assigning PDCCH signaling, PDSCH signaling, PSCCH signaling, PSSCH signaling, or any combination thereof to one or more frequency resources within the set of frequency resources.

Aspect 75: The method of any of aspects 68 through 74, where the indication that the UE is to select the bandwidth size of the active BWP is received in UE assistance information, RRC signaling, a MAC-CE, UCI, SCI, PSFCH signaling, or any combination thereof.

Aspect 76: The method of any of aspects 68 through 75, where the indication that the UE is to select the bandwidth size of the active BWP includes a bit indicating that the UE selected the bandwidth size of the active BWP, a bit map indicating a configuration selected for the bandwidth size of the active BWP from a set of multiple configurations, a bit map indicating a set of resources corresponding to the selected bandwidth size of the active BWP, or any combination thereof.

Aspect 77: The method of any of aspects 68 through 76, where the active BWP is configured for uplink reception, downlink transmission, sidelink reception, sidelink transmission, or any combination thereof.

Aspect 78: A method for wireless communications, including: receiving an indication that a UE is to switch an active BWP from a first BWP to a default BWP prior to an expiration of a timer configured for the UE to fall back to the default BWP, the switching the active BWP being in accordance with an energy level of the UE satisfying a threshold energy level; switching the active BWP for communications with the UE from the first BWP to the default BWP in accordance with the received indication; and communicating using the default BWP as the active BWP.

Aspect 79: The method of aspect 78, where the indication includes a request to switch the active BWP from the first BWP to the default BWP, the method further including: transmitting, in response to the request, a confirmation for the UE to switch the active BWP from the first BWP to the default BWP, where the communicating using the default BWP as the active BWP is in accordance with the confirmation.

Aspect 80: The method of any of aspects 78 through 79, further including: transmitting control signaling configuring the UE to support switching the active BWP from the first BWP to the default BWP prior to the expiration of the timer configured for the UE to fall back to the default BWP.

Aspect 81: The method of any of aspects 78 through 80, where the indication that the UE is to switch the active BWP from the first BWP to the default BWP includes an indication of when the switching occurred at the UE, the method further including: retransmitting a message in response to the indication of when the switching occurred at the UE.

Aspect 82: The method of any of aspects 78 through 81, where the default BWP spans fewer frequency resources than the first BWP.

Aspect 83: An apparatus for wireless communications at a UE, including: means for selecting a bandwidth size of an active BWP in accordance with an energy level of the UE satisfying a threshold energy level; means for switching the active BWP from a first bandwidth size to the selected bandwidth size; and means for transmitting an indication that the bandwidth size of the active BWP is selected.

Aspect 84: The apparatus of aspect 83, further including: means for communicating using the selected bandwidth size of the active BWP in accordance with the indication and the switching.

Aspect 85: The apparatus of any of aspects 83 through 84, where the indication that the bandwidth size of the active BWP is selected includes a request to reduce the bandwidth size of the active BWP, the apparatus further including: means for receiving, in response to the request, a confirmation to reduce the bandwidth size of the active BWP, where the active BWP is switched from the first bandwidth size to the selected bandwidth size in accordance with the received confirmation.

Aspect 86: The apparatus of aspect 85, where the request indicates the energy level of the UE.

Aspect 87: The apparatus of any of aspects 83 through 86, further including: means for receiving control signaling configuring the UE to support selecting the bandwidth size of the active BWP in accordance with the energy level of the UE satisfying the threshold energy level, where the bandwidth size of the active BWP is selected according to the control signaling.

Aspect 88: The apparatus of aspect 87, where the control signaling indicates a set of multiple configurations for reducing BWPs, a configuration of the set of multiple configurations corresponding to a respective BWP of a set of multiple BWPs configured for the UE.

Aspect 89: The apparatus of any of aspects 87 through 88, where the control signaling includes RRC signaling, a MAC-CE, DCI, SCI, or any combination thereof.

Aspect 90: The apparatus of any of aspects 83 through 89, where the means for switching the active BWP from the first bandwidth size to the selected bandwidth size include: means for modifying the bandwidth size of the active BWP from a first set of frequency resources to a second set of frequency resources, the second set of frequency resources including fewer frequency resources than the first set of frequency resources, and the second set of frequency resources supporting reception of control signaling configured for the active BWP.

Aspect 91: The apparatus of aspect 90, where the second set of frequency resources includes searching occasions for SSBs, SI, paging signals, or any combination thereof.

Aspect 92: The apparatus of any of aspects 83 through 91, further including: means for monitoring a current energy level of the UE, where the energy level of the UE satisfying the threshold energy level includes the current energy level of the UE being below the threshold energy level; and means for triggering the selecting the bandwidth size of the active BWP in accordance with the current energy level of the UE being below the threshold energy level.

Aspect 93: The apparatus of any of aspects 83 through 92, where the indication that the bandwidth size of the active BWP is selected is transmitted in UE assistance information, RRC signaling, a MAC-CE, UCI, SCI, PSFCH signaling, or any combination thereof.

Aspect 94: The apparatus of any of aspects 83 through 93, where the indication that the bandwidth size of the active BWP is selected includes a bit indicating that the bandwidth size of the active BWP is selected, a bit map indicating a configuration selected for the bandwidth size of the active BWP from a set of multiple configurations, a bit map indicating a set of resources corresponding to the selected bandwidth size of the active BWP, or any combination thereof.

Aspect 95: The apparatus of any of aspects 83 through 94, where the bandwidth size of the active BWP is selected for a resource pool of a set of multiple resource pools for sidelink communications.

Aspect 96: The apparatus of any of aspects 83 through 95, where the active BWP is configured for uplink transmission, downlink reception, sidelink transmission, sidelink reception, or any combination thereof.

Aspect 97: An apparatus for wireless communications at a UE, including: means for switching an active BWP from a first BWP to a default BWP prior to an expiration of a timer for falling back to the default BWP, the switching the active BWP being in accordance with an energy level of the UE satisfying a threshold energy level; and means for communicating using the default BWP as the active BWP.

Aspect 98: The apparatus of aspect 97, further including: means for initializing the timer for falling back to the default BWP in response to inactivity on the active BWP by the UE; and means for deactivating the timer for falling back to the default BWP in accordance with the switching and prior to the expiration of the timer for falling back to the default BWP.

Aspect 99: The apparatus of aspect 97, where the timer for falling back to the default BWP corresponds to the energy level of the UE failing to satisfy the threshold energy level, the apparatus further including: means for initializing a second timer corresponding to the energy level of the UE satisfying the threshold energy level, where a duration of the second timer is shorter than a duration of the timer configured for falling back to the default BWP, and where the active BWP is switched from the first BWP to the default BWP in accordance with an expiration of the second timer.

Aspect 100: The apparatus of aspect 99, further including: means for storing a set of multiple durations corresponding to a set of multiple timers including at least the timer and the second timer, where each timer of the set of multiple timers corresponds to a respective energy state of the UE.

Aspect 101: The apparatus of any of aspects 97 through 100, further including: means for receiving control signaling configuring the UE to support switching the active BWP from the first BWP to the default BWP prior to the expiration of the timer for falling back to the default BWP.

Aspect 102: The apparatus of any of aspects 97 through 101, further including: means for transmitting an indication of the switching the active BWP from the first BWP to the default BWP.

Aspect 103: The apparatus of aspect 102, where the indication includes a request to switch the active BWP from the first BWP to the default BWP, the apparatus further including: means for receiving, in response to the request, a confirmation to switch the active BWP from the first BWP to the default BWP, where the active BWP is switched from the first BWP to the default BWP in accordance with the received confirmation.

Aspect 104: The apparatus of any of aspects 102 through 103, where the indication of the switching the active BWP from the first BWP to the default BWP includes an indication of when the switching occurred.

Aspect 105: The apparatus of any of aspects 97 through 104, where the switching the active BWP is further in accordance with a charging rate of the UE satisfying a threshold charging rate.

Aspect 106: The apparatus of any of aspects 97 through 105, where the switching the active BWP is further in accordance with a remaining active time for the timer for falling back to the default BWP satisfying a threshold remaining active time.

Aspect 107: The apparatus of any of aspects 97 through 106, further including: means for monitoring a current energy level of the UE, where the energy level of the UE satisfying the threshold energy level includes the current energy level of the UE being below the threshold energy level; and means for triggering the switching the active BWP in accordance with the current energy level of the UE being below the threshold energy level.

Aspect 108: The apparatus of any of aspects 97 through 107, where the default BWP spans fewer frequency resources than the first BWP.

Aspect 109: An apparatus for wireless communications, including: means for receiving an indication that a UE is to select a bandwidth size of an active BWP in accordance with an energy level of the UE satisfying a threshold energy level; and means for selecting the bandwidth size of the active BWP for communications with the UE in accordance with the received indication.

Aspect 110: The apparatus of aspect 109, further including: means for communicating using the selected bandwidth size of the active BWP.

Aspect 111: The apparatus of any of aspects 109 through 110, where the indication that the UE is to select the bandwidth size of the active BWP includes a request to reduce the bandwidth size of the active BWP, the apparatus further including: means for transmitting, in response to the request, a confirmation for the UE to reduce the bandwidth size of the active BWP, where the selecting the bandwidth size of the active BWP is in accordance with the confirmation.

Aspect 112: The apparatus of any of aspects 109 through 111, further including: means for transmitting control signaling configuring the UE to support selecting the bandwidth size of the active BWP in accordance with the energy level of the UE satisfying the threshold energy level, where the indication that the UE is to select the bandwidth size of the active BWP is received according to the control signaling.

Aspect 113: The apparatus of aspect 112, where the control signaling indicates a set of multiple configurations for reducing BWPs, a configuration of the set of multiple configurations corresponding to a respective BWP of a set of multiple BWPs configured for the UE.

Aspect 114: The apparatus of any of aspects 112 through 113, where the control signaling includes RRC signaling, a MAC-CE, DCI, SCI, or any combination thereof.

Aspect 115: The apparatus of any of aspects 109 through 114, where the selected bandwidth size corresponds to a set of frequency resources, the apparatus further including: means for assigning PDCCH signaling, PDSCH signaling, PSCCH signaling, PSSCH signaling, or any combination thereof to one or more frequency resources within the set of frequency resources.

Aspect 116: The apparatus of any of aspects 109 through 115, where the indication that the UE is to select the bandwidth size of the active BWP is received in UE assistance information, RRC signaling, a MAC-CE, UCI, SCI, PSFCH signaling, or any combination thereof.

Aspect 117: The apparatus of any of aspects 109 through 116, where the indication that the UE is to select the bandwidth size of the active BWP includes a bit indicating that the UE selected the bandwidth size of the active BWP, a bit map indicating a configuration selected for the bandwidth size of the active BWP from a set of multiple configurations, a bit map indicating a set of resources corresponding to the selected bandwidth size of the active BWP, or any combination thereof.

Aspect 118: The apparatus of any of aspects 109 through 117, where the active BWP is configured for uplink reception, downlink transmission, sidelink reception, sidelink transmission, or any combination thereof.

Aspect 119: An apparatus for wireless communications, including: means for receiving an indication that a UE is to switch an active BWP from a first BWP to a default BWP prior to an expiration of a timer configured for the UE to fall back to the default BWP, the switching the active BWP being in accordance with an energy level of the UE satisfying a threshold energy level; means for switching the active BWP for communications with the UE from the first BWP to the default BWP in accordance with the received indication; and means for communicating using the default BWP as the active BWP.

Aspect 120: The apparatus of aspect 119, where the indication includes a request to switch the active BWP from the first BWP to the default BWP, the apparatus further including: means for transmitting, in response to the request, a confirmation for the UE to switch the active BWP from the first BWP to the default BWP, where the communicating using the default BWP as the active BWP is in accordance with the confirmation.

Aspect 121: The apparatus of any of aspects 119 through 120, further including: means for transmitting control signaling configuring the UE to support switching the active BWP from the first BWP to the default BWP prior to the expiration of the timer configured for the UE to fall back to the default BWP.

Aspect 122: The apparatus of any of aspects 119 through 121, where the indication that the UE is to switch the active BWP from the first BWP to the default BWP includes an indication of when the switching occurred at the UE, the apparatus further including: means for retransmitting a message in response to the indication of when the switching occurred at the UE.

Aspect 123: The apparatus of any of aspects 119 through 122, where the default BWP spans fewer frequency resources than the first BWP.

Aspect 124: A non-transitory computer-readable medium storing code for wireless communications at a UE, the code including instructions executable by a processor to: select a bandwidth size of an active BWP in accordance with an energy level of the UE satisfying a threshold energy level; switch the active BWP from a first bandwidth size to the selected bandwidth size; and transmit an indication that the bandwidth size of the active BWP is selected.

Aspect 125: The non-transitory computer-readable medium of aspect 124, where the instructions are further executable by the processor to: communicate using the selected bandwidth size of the active BWP in accordance with the indication and the switching.

Aspect 126: The non-transitory computer-readable medium of any of aspects 124 through 125, where the indication that the bandwidth size of the active BWP is selected includes a request to reduce the bandwidth size of the active BWP, and the instructions are further executable by the processor to: receive, in response to the request, a confirmation to reduce the bandwidth size of the active BWP, where the active BWP is switched from the first bandwidth size to the selected bandwidth size in accordance with the received confirmation.

Aspect 127: The non-transitory computer-readable medium of aspect 126, where the request indicates the energy level of the UE.

Aspect 128: The non-transitory computer-readable medium of any of aspects 124 through 127, where the instructions are further executable by the processor to: receive control signaling configuring the UE to support selecting the bandwidth size of the active BWP in accordance with the energy level of the UE satisfying the threshold energy level, where the bandwidth size of the active BWP is selected according to the control signaling.

Aspect 129: The non-transitory computer-readable medium of aspect 128, where the control signaling indicates a set of multiple configurations for reducing BWPs, a configuration of the set of multiple configurations corresponding to a respective BWP of a set of multiple BWPs configured for the UE.

Aspect 130: The non-transitory computer-readable medium of any of aspects 128 through 129, where the control signaling includes RRC signaling, a MAC-CE, DCI, SCI, or any combination thereof.

Aspect 131: The non-transitory computer-readable medium of any of aspects 124 through 130, where the instructions to switch the active BWP from the first bandwidth size to the selected bandwidth size are executable by the processor to: modify the bandwidth size of the active BWP from a first set of frequency resources to a second set of frequency resources, the second set of frequency resources including fewer frequency resources than the first set of frequency resources, and the second set of frequency resources supporting reception of control signaling configured for the active BWP.

Aspect 132: The non-transitory computer-readable medium of aspect 131, where the second set of frequency resources includes searching occasions for SSBs, SI, paging signals, or any combination thereof.

Aspect 133: The non-transitory computer-readable medium of any of aspects 124 through 132, where the instructions are further executable by the processor to: monitor a current energy level of the UE, where the energy level of the UE satisfying the threshold energy level includes the current energy level of the UE being below the threshold energy level; and trigger the selecting the bandwidth size of the active BWP in accordance with the current energy level of the UE being below the threshold energy level.

Aspect 134: The non-transitory computer-readable medium of any of aspects 124 through 133, where the indication that the bandwidth size of the active BWP is selected is transmitted in UE assistance information, RRC signaling, a MAC-CE, UCI, SCI, PSFCH signaling, or any combination thereof.

Aspect 135: The non-transitory computer-readable medium of any of aspects 124 through 134, where the indication that the bandwidth size of the active BWP is selected includes a bit indicating that the bandwidth size of the active BWP is selected, a bit map indicating a configuration selected for the bandwidth size of the active BWP from a set of multiple configurations, a bit map indicating a set of resources corresponding to the selected bandwidth size of the active BWP, or any combination thereof.

Aspect 136: The non-transitory computer-readable medium of any of aspects 124 through 135, where the bandwidth size of the active BWP is selected for a resource pool of a set of multiple resource pools for sidelink communications.

Aspect 137: The non-transitory computer-readable medium of any of aspects 124 through 136, where the active BWP is configured for uplink transmission, downlink reception, sidelink transmission, sidelink reception, or any combination thereof.

Aspect 138: A non-transitory computer-readable medium storing code for wireless communications at a UE, the code including instructions executable by a processor to: switch an active BWP from a first BWP to a default BWP prior to an expiration of a timer for falling back to the default BWP, the switching the active BWP being in accordance with an energy level of the UE satisfying a threshold energy level; and communicate using the default BWP as the active BWP.

Aspect 139: The non-transitory computer-readable medium of aspect 138, where the instructions are further executable by the processor to: initialize the timer for falling back to the default BWP in response to inactivity on the active BWP by the UE; and deactivate the timer for falling back to the default BWP in accordance with the switching and prior to the expiration of the timer for falling back to the default BWP.

Aspect 140: The non-transitory computer-readable medium of aspect 138, where the timer for falling back to the default BWP corresponds to the energy level of the UE failing to satisfy the threshold energy level, and the instructions are further executable by the processor to: initialize a second timer corresponding to the energy level of the UE satisfying the threshold energy level, where a duration of the second timer is shorter than a duration of the timer configured for falling back to the default BWP, and where the active BWP is switched from the first BWP to the default BWP in accordance with an expiration of the second timer.

Aspect 141: The non-transitory computer-readable medium of aspect 140, where the instructions are further executable by the processor to: store a set of multiple durations corresponding to a set of multiple timers including at least the timer and the second timer, where each timer of the set of multiple timers corresponds to a respective energy state of the UE.

Aspect 142: The non-transitory computer-readable medium of any of aspects 138 through 141, where the instructions are further executable by the processor to: receive control signaling configuring the UE to support switching the active BWP from the first BWP to the default BWP prior to the expiration of the timer for falling back to the default BWP.

Aspect 143: The non-transitory computer-readable medium of any of aspects 138 through 142, where the instructions are further executable by the processor to: transmit an indication of the switching the active BWP from the first BWP to the default BWP.

Aspect 144: The non-transitory computer-readable medium of aspect 143, where the indication includes a request to switch the active BWP from the first BWP to the default BWP, and the instructions are further executable by the processor to: receive, in response to the request, a confirmation to switch the active BWP from the first BWP to the default BWP, where the active BWP is switched from the first BWP to the default BWP in accordance with the received confirmation.

Aspect 145: The non-transitory computer-readable medium of any of aspects 143 through 144, where the indication of the switching the active BWP from the first BWP to the default BWP includes an indication of when the switching occurred.

Aspect 146: The non-transitory computer-readable medium of any of aspects 138 through 145, where the switching the active BWP is further in accordance with a charging rate of the UE satisfying a threshold charging rate.

Aspect 147: The non-transitory computer-readable medium of any of aspects 138 through 146, where the switching the active BWP is further in accordance with a remaining active time for the timer for falling back to the default BWP satisfying a threshold remaining active time.

Aspect 148: The non-transitory computer-readable medium of any of aspects 138 through 147, where the instructions are further executable by the processor to: monitor a current energy level of the UE, where the energy level of the UE satisfying the threshold energy level includes the current energy level of the UE being below the threshold energy level; and trigger the switching the active BWP in accordance with the current energy level of the UE being below the threshold energy level.

Aspect 149: The non-transitory computer-readable medium of any of aspects 138 through 148, where the default BWP spans fewer frequency resources than the first BWP.

Aspect 150: A non-transitory computer-readable medium storing code for wireless communications, the code including instructions executable by a processor to: receive an indication that a UE is to select a bandwidth size of an active BWP in accordance with an energy level of the UE satisfying a threshold energy level; and select the bandwidth size of the active BWP for communications with the UE in accordance with the received indication.

Aspect 151: The non-transitory computer-readable medium of aspect 150, where the instructions are further executable by the processor to: communicate using the selected bandwidth size of the active BWP.

Aspect 152: The non-transitory computer-readable medium of any of aspects 150 through 151, where the indication that the UE is to select the bandwidth size of the active BWP includes a request to reduce the bandwidth size of the active BWP, and the instructions are further executable by the processor to: transmit, in response to the request, a confirmation for the UE to reduce the bandwidth size of the active BWP, where the selecting the bandwidth size of the active BWP is in accordance with the confirmation.

Aspect 153: The non-transitory computer-readable medium of any of aspects 150 through 152, where the instructions are further executable by the processor to: transmit control signaling configuring the UE to support selecting the bandwidth size of the active BWP in accordance with the energy level of the UE satisfying the threshold energy level, where the indication that the UE is to select the bandwidth size of the active BWP is received according to the control signaling.

Aspect 154: The non-transitory computer-readable medium of aspect 153, where the control signaling indicates a set of multiple configurations for reducing BWPs, a configuration of the set of multiple configurations corresponding to a respective BWP of a set of multiple BWPs configured for the UE.

Aspect 155: The non-transitory computer-readable medium of any of aspects 153 through 154, where the control signaling includes RRC signaling, a medium access control MAC-CE, DCI, SCI, or any combination thereof.

Aspect 156: The non-transitory computer-readable medium of any of aspects 150 through 155, where the selected bandwidth size corresponds to a set of frequency resources, and the instructions are further executable by the processor to: assign PDCCH signaling, PDSCH signaling, PSCCH signaling, PSSCH signaling, or any combination thereof to one or more frequency resources within the set of frequency resources.

Aspect 157: The non-transitory computer-readable medium of any of aspects 150 through 156, where the indication that the UE is to select the bandwidth size of the active BWP is received in UE assistance information, RRC signaling, a medium access control MAC-CE, UCI, SCI, PSFCH signaling, or any combination thereof.

Aspect 158: The non-transitory computer-readable medium of any of aspects 150 through 157, where the indication that the UE is to select the bandwidth size of the active BWP includes a bit indicating that the UE selected the bandwidth size of the active BWP, a bit map indicating a configuration selected for the bandwidth size of the active BWP from a set of multiple configurations, a bit map indicating a set of resources corresponding to the selected bandwidth size of the active BWP, or any combination thereof.

Aspect 159: The non-transitory computer-readable medium of any of aspects 150 through 158, where the active BWP is configured for uplink reception, downlink transmission, sidelink reception, sidelink transmission, or any combination thereof.

Aspect 160: A non-transitory computer-readable medium storing code for wireless communications, the code including instructions executable by a processor to: receive an indication that a UE is to switch an active BWP from a first BWP to a default BWP prior to an expiration of a timer configured for the UE to fall back to the default BWP, the switching the active BWP being in accordance with an energy level of the UE satisfying a threshold energy level; switch the active BWP for communications with the UE from the first BWP to the default BWP in accordance with the received indication; and communicate using the default BWP as the active BWP.

Aspect 161: The non-transitory computer-readable medium of aspect 160, where the indication includes a request to switch the active BWP from the first BWP to the default BWP, and the instructions are further executable by the processor to: transmit, in response to the request, a confirmation for the UE to switch the active BWP from the first BWP to the default BWP, where the communicating using the default BWP as the active BWP is in accordance with the confirmation.

Aspect 162: The non-transitory computer-readable medium of any of aspects 160 through 161, where the instructions are further executable by the processor to: transmit control signaling configuring the UE to support switching the active BWP from the first BWP to the default BWP prior to the expiration of the timer configured for the UE to fall back to the default BWP.

Aspect 163: The non-transitory computer-readable medium of any of aspects 160 through 162, where the indication that the UE is to switch the active BWP from the first BWP to the default BWP includes an indication of when the switching occurred at the UE, and the instructions are further executable by the processor to: retransmit a message in response to the indication of when the switching occurred at the UE.

Aspect 164: The non-transitory computer-readable medium of any of aspects 160 through 163, where the default BWP spans fewer frequency resources than the first BWP.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications, comprising:
    a processing system configured to:
        select a bandwidth size of an active bandwidth part (BWP) in accordance with an energy level of a user equipment (UE) satisfying a threshold energy level; and
        switch the active BWP from a first bandwidth size to the selected bandwidth size in accordance with a confirmation to reduce the first bandwidth size of the active BWP; and
    an interface configured to:
        output a request to reduce the first bandwidth size of the active BWP;
        obtain, in response to the request, the confirmation to reduce the first bandwidth size of the active BWP; and
        output an indication that the bandwidth size of the active BWP is selected.

2. The apparatus of claim 1, wherein the interface is further configured to:

output or obtain signaling using the selected bandwidth size of the active BWP in accordance with the indication and the switching.

3. The apparatus of claim 1, wherein the interface is further configured to:
obtain control signaling configuring the UE to support selecting the bandwidth size of the active BWP in accordance with the energy level of the UE satisfying the threshold energy level, wherein the bandwidth size of the active BWP is selected according to the control signaling.

4. The apparatus of claim 3, wherein the control signaling indicates a plurality of configurations for reducing BWPs, a configuration of the plurality of configurations corresponding to a respective BWP of a plurality of BWPs configured for the UE.

5. The apparatus of claim 1, wherein the processing system configured to switch the active BWP from the first bandwidth size to the selected bandwidth size is configured to:
modify the bandwidth size of the active BWP from a first set of frequency resources to a second set of frequency resources, the second set of frequency resources comprising fewer frequency resources than the first set of frequency resources, and the second set of frequency resources supporting obtaining control signaling configured for the active BWP.

6. The apparatus of claim 1, wherein:
the interface is further configured to:
obtain information indicating a current energy level of the UE, wherein the energy level of the UE satisfying the threshold energy level comprises the current energy level of the UE being below the threshold energy level; and
the processing system is further configured to:
trigger the selecting the bandwidth size of the active BWP in accordance with the current energy level of the UE being below the threshold energy level.

7. The apparatus of claim 1, wherein the indication that the bandwidth size of the active BWP is selected comprises a bit indicating that the bandwidth size of the active BWP is selected, a bit map indicating a configuration selected for the bandwidth size of the active BWP from a plurality of configurations, a bit map indicating a set of resources corresponding to the selected bandwidth size of the active BWP, or any combination thereof.

8. The apparatus of claim 1, wherein the bandwidth size of the active BWP is selected for a resource pool of a plurality of resource pools for sidelink communications.

9. An apparatus for wireless communications, comprising:
an interface configured to:
obtain a request to reduce a bandwidth size of an active bandwidth part (BWP);
output, in response to the request, a confirmation for a user equipment (UE) to reduce the bandwidth size of the active BWP; and
obtain an indication that the UE is to select the bandwidth size of the active BWP in accordance with an energy level of the UE satisfying a threshold energy level; and
a processing system configured to:
select the bandwidth size of the active BWP for communications with the UE in accordance with the obtained indication and the confirmation.

10. The apparatus of claim 9, wherein the interface is further configured to:

output or obtain signaling using the selected bandwidth size of the active BWP.

11. The apparatus of claim 9, wherein the interface is further configured to:
output control signaling configuring the UE to support selecting the bandwidth size of the active BWP in accordance with the energy level of the UE satisfying the threshold energy level, wherein the indication that the UE is to select the bandwidth size of the active BWP is obtained according to the control signaling.

12. The apparatus of claim 11, wherein the control signaling indicates a plurality of configurations for reducing BWPs, a configuration of the plurality of configurations corresponding to a respective BWP of a plurality of BWPs configured for the UE.

13. The apparatus of claim 9, wherein the selected bandwidth size corresponds to a set of frequency resources, and the processing system is further configured to:
assign physical downlink control channel (PDCCH) signaling, physical downlink shared channel (PDSCH) signaling, physical sidelink control channel (PSCCH) signaling, physical sidelink shared channel (PSSCH) signaling, or any combination thereof to one or more frequency resources within the set of frequency resources.

14. A method for wireless communications, comprising:
selecting a bandwidth size of an active bandwidth part (BWP) in accordance with an energy level of a user equipment (UE) satisfying a threshold energy level;
transmitting a request to reduce a first bandwidth size of the active BWP;
receiving, in response to the request, a confirmation to reduce the first bandwidth size of the active BWP;
switching the active BWP from the first bandwidth size to the selected bandwidth size in accordance with the received confirmation; and
transmitting an indication that the bandwidth size of the active BWP is selected.

15. The method of claim 14, further comprising:
communicating signaling using the selected bandwidth size of the active BWP in accordance with the indication and the switching.

16. The method of claim 14, further comprising:
receiving control signaling configuring the UE to support selecting the bandwidth size of the active BWP in accordance with the energy level of the UE satisfying the threshold energy level, wherein the bandwidth size of the active BWP is selected according to the control signaling.

17. The method of claim 16, wherein the control signaling indicates a plurality of configurations for reducing BWPs, a configuration of the plurality of configurations corresponding to a respective BWP of a plurality of BWPs configured for the UE.

18. The method of claim 14, wherein switching the active BWP from the first bandwidth size to the selected bandwidth size comprises:
modifying the bandwidth size of the active BWP from a first set of frequency resources to a second set of frequency resources, the second set of frequency resources comprising fewer frequency resources than the first set of frequency resources, and the second set of frequency resources supporting receiving control signaling configured for the active BWP.

19. The method of claim 14, further comprising:
receiving information indicating a current energy level of the UE, wherein the energy level of the UE satisfying the threshold energy level comprises the current energy level of the UE being below the threshold energy level; and triggering the selecting the bandwidth size of the active BWP in accordance with the current energy level of the UE being below the threshold energy level.

20. The method of claim 14, wherein the indication that the bandwidth size of the active BWP is selected comprises a bit indicating that the bandwidth size of the active BWP is selected, a bit map indicating a configuration selected for the bandwidth size of the active BWP from a plurality of configurations, a bit map indicating a set of resources corresponding to the selected bandwidth size of the active BWP, or any combination thereof.

21. The method of claim 14, wherein the bandwidth size of the active BWP is selected for a resource pool of a plurality of resource pools for sidelink communications.

22. A method for wireless communications, comprising:
receiving a request to reduce a bandwidth size of an active bandwidth part (BWP);
transmitting, in response to the request, a confirmation for a user equipment (UE) to reduce the bandwidth size of the active BWP;
receiving an indication that the UE is to select the bandwidth size of the active BWP in accordance with an energy level of the UE satisfying a threshold energy level; and
selecting the bandwidth size of the active BWP for communications with the UE in accordance with the received indication and the confirmation.

23. The method of claim 22, further comprising:
communicating signaling using the selected bandwidth size of the active BWP.

24. The method of claim 22, further comprising:
transmitting control signaling configuring the UE to support selecting the bandwidth size of the active BWP in accordance with the energy level of the UE satisfying the threshold energy level, wherein the indication that the UE is to select the bandwidth size of the active BWP is received according to the control signaling.

25. The method of claim 24, wherein the control signaling indicates a plurality of configurations for reducing BWPs, a configuration of the plurality of configurations corresponding to a respective BWP of a plurality of BWPs configured for the UE.

26. The method of claim 22, wherein the selected bandwidth size corresponds to a set of frequency resources, the method further comprising:
assigning physical downlink control channel (PDCCH) signaling, physical downlink shared channel (PDSCH) signaling, physical sidelink control channel (PSCCH) signaling, physical sidelink shared channel (PSSCH) signaling, or any combination thereof to one or more frequency resources within the set of frequency resources.

* * * * *